United States Patent
Abdollahi et al.

(10) Patent No.: US 9,885,871 B2
(45) Date of Patent: *Feb. 6, 2018

(54) MODULAR HEADS-UP DISPLAY SYSTEMS

(71) Applicant: Intel Corporation, Santa Clara, CA (US)

(72) Inventors: Hamid Abdollahi, Vancouver (CA); Adam Capelin, Vancouver (CA); Xichi Zheng, Vancouver (CA); Braden Fraser Hall, Kelowna (CA)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,551

(22) Filed: May 9, 2016

(65) Prior Publication Data

US 2016/0357021 A1    Dec. 8, 2016

Related U.S. Application Data

(63) Continuation of application No. 14/329,800, filed on Jul. 11, 2014, now Pat. No. 9,354,446, which is a
(Continued)

(51) Int. Cl.
*G02B 27/01* (2006.01)
*A63B 69/18* (2006.01)
(Continued)

(52) U.S. Cl.
CPC ..... *G02B 27/0176* (2013.01); *G02B 27/0149* (2013.01); *G02B 27/0172* (2013.01);
(Continued)

(58) Field of Classification Search
CPC ............ G02B 27/0149; G02B 27/0176; G02B 2027/0178; A63B 2071/0666; A63B 69/18; A63B 69/16; G09B 9/32; G06F 3/12
See application file for complete search history.

(56) References Cited

U.S. PATENT DOCUMENTS

| | | |
|---|---|---|
| 3,800,207 A | 3/1974 | Kott |
| 4,969,714 A | 11/1990 | Fournier et al. |

(Continued)

FOREIGN PATENT DOCUMENTS

| | | |
|---|---|---|
| WO | 2011085501 A1 | 7/2011 |
| WO | 2011044680 | 8/2011 |

OTHER PUBLICATIONS

International Search Report and Written Opinion dated Jun. 11, 2012 issued in corresponding International application PCT/CA2012/050121.

(Continued)

*Primary Examiner* — Liliana Cerullo
(74) *Attorney, Agent, or Firm* — Patent Capital Group

(57) ABSTRACT

A Heads-Up Display (HUD) system comprises a processor, a power source, and one or more sensors coupled to a frame connector. The processor is configured to receive signals from the one or more sensors and output image data. A display is mounted on a display arm extending from the frame connector. The display is configured to display images based on the image data. A goggles frame is configured to releasably receive the frame connector. The display is located within a field of view of a user wearing the goggles frame when the frame connector is received by the goggles frame.

20 Claims, 19 Drawing Sheets

Related U.S. Application Data continuation of application No. 14/127,902, filed as application No. PCT/CA2012/050121 on Feb. 29, 2012, now Pat. No. 8,810,482.

(60) Provisional application No. 61/563,480, filed on Nov. 23, 2011, provisional application No. 61/502,566, filed on Jun. 29, 2011.

(51) Int. Cl.
  *A63B 69/16* (2006.01)
  *A63B 71/06* (2006.01)
  *A63B 69/00* (2006.01)

(52) U.S. Cl.
  CPC ........... *A63B 69/0024* (2013.01); *A63B 69/16* (2013.01); *A63B 69/18* (2013.01); *A63B 71/0622* (2013.01); *A63B 2071/0666* (2013.01); *A63B 2071/0694* (2013.01); *G02B 2027/014* (2013.01); *G02B 2027/0138* (2013.01); *G02B 2027/0159* (2013.01); *G02B 2027/0178* (2013.01)

(56) References Cited

U.S. PATENT DOCUMENTS

| | | |
|---|---|---|
| 5,473,527 A | 12/1995 | Gold |
| 6,088,165 A | 7/2000 | Janeczko et al. |
| 6,157,291 A | 12/2000 | Kuenster et al. |
| 6,480,174 B1 | 11/2002 | Kaufmann et al. |
| 8,810,482 B2 | 8/2014 | Abdollahi et al. |
| 9,354,446 B2 | 5/2016 | Abdollahi et al. |
| 2008/0169998 A1 | 7/2008 | Jacobsen et al. |
| 2008/0263752 A1 | 10/2008 | Solinsky et al. |
| 2009/0201460 A1 | 8/2009 | Blum et al. |
| 2010/0091377 A1 | 4/2010 | Hedges et al. |
| 2011/0239354 A1 | 10/2011 | Celona et al. |
| 2012/0075168 A1 | 3/2012 | Osterhout et al. |

OTHER PUBLICATIONS

USPTO Final Rejection issued in U.S. Appl. No. 14/329,800 dated Oct. 9, 2015.

USPTO Non-Final Rejection issued in U.S. Appl. No. 14/127,902 dated Mar. 6, 2014.

USPTO Non-Final Rejection issued in U.S. Appl. No. 14/329,800 dated Jun. 23, 2015.

USPTO Notice of Allowance issued in U.S. Appl. No. 14/127,902 dated Apr. 18, 2014.

USPTO Notice of Allowance issued in U.S. Appl. No. 14/329,800 dated Jan. 26, 2016.

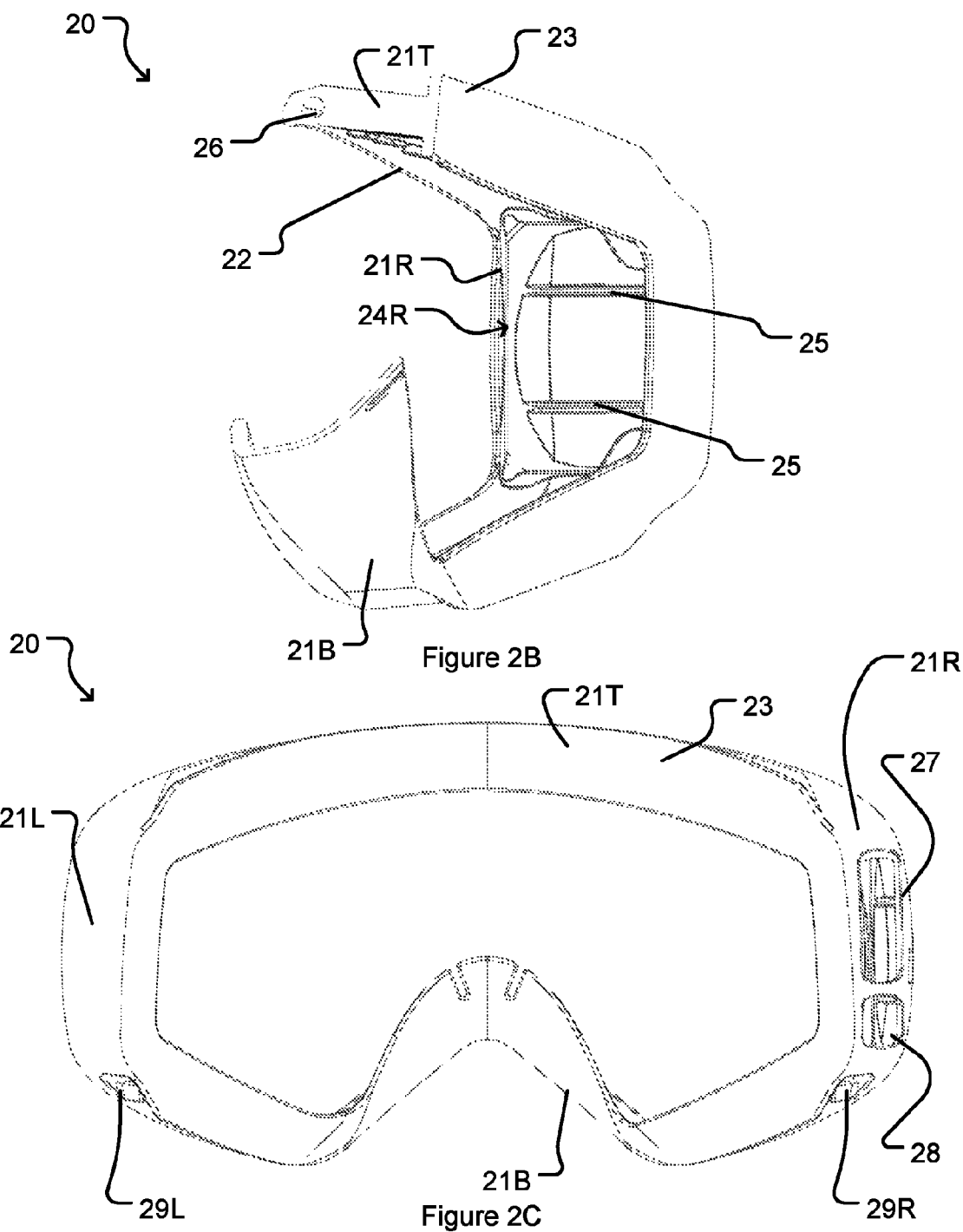

US 9,885,871 B2

MODULAR HEADS-UP DISPLAY SYSTEMS

REFERENCE TO RELATED APPLICATIONS

This application is a continuation of U.S. application Ser. No. 14/329,800 filed Jul. 11, 2014 which is a continuation of U.S. application Ser. No. 14/127,902 filed Dec. 19, 2013 which is a National Phase Entry of International Patent Application No. PCT/CA2012/050121, filed Feb. 29, 2012, which claims Paris Convention priority from U.S. provisional patent applications No. 61/502,568 filed 29 Jun. 2011 and No. 61/563,480 filed 23 Nov. 2011, both of which are entitled MODULAR HEADS-UP DISPLAY SYSTEMS. For purposes of the United States, this application claims the benefit under 35 U.S.C. §119 and/or 35 U.S.C. §365 of International Patent Application No. PCT/CA2012/050121 filed Feb. 29, 2012 and U.S. provisional patent applications No. 61/502,568 filed 29 Jun. 2011 and No. 61/563,480 filed 23 Nov. 2011, all of which are hereby incorporated herein by reference in their entirety.

TECHNICAL FIELD

This invention relates to modular Heads-Up Display (HUD) systems.

BACKGROUND

Any discussion of the prior art throughout the specification should in no way be considered as an admission that such prior art is widely known or forms part of general common knowledge in the field.

In many activities that people participate in, it is desirable or required that they wear head and/or eye protection. By way of non-limiting example, many skiers and snowboarders wear goggles, and many motorcyclists and hockey players wear helmets, which may have visors.

Also, there are systems for providing skiers, snowboarders and others taking part in physical activities with information regarding their performance or status. Some current solutions include handheld GPS devices, performance measurement units, wristwatches, and mobile phones. There also exist such information systems built into goggles or helmets such as those disclosed, for example, in International Applications No. PCT/CA2010/001592 and No. PCT/CA2011/050023, which are hereby incorporated by reference herein.

The inventors have determined a need for improved head-mounted information systems.

SUMMARY

This summary is provided to introduce a selection of representative concepts and aspects of the invention in a simplified form that are further described below in the description. This summary is not intended to identify key features or essential features of the claimed subject matter, nor is it intended to be used in any way that would limit the scope of the claimed subject matter.

One aspect provides a Heads-Up Display (HUD) system configured for removable installation in headgear having a frame. The HUD system comprises an electronic system comprising one or more sensors, a processor for processing signals from the one or more sensors and outputting image data, a display for displaying the image data, and a power supply, at least one compartment for housing components of the electronic system other than the display, the at least one compartment configured to be removably received in a recess in the frame of the headgear, and, a display arm for mounting the display, the display arm extending from the at least one compartment to a location within a field of vision of a user wearing the headgear.

Another aspect provides a goggles frame comprising a top portion, first and second side portions and a bottom portion. The goggles frame defines a first recess in the first side portion configured to removably receive a first compartment of a Heads-Up Display (HUD) system, and a second recess defined in the second side portion configured to removably receive a second compartment of the HUD system.

Another aspect provides apparatus comprising a goggles frame and a Heads-Up Display (HUD) system comprising a frame connector, a processor, a power source, and one or more sensors coupled to the frame connector, the processor configured to receive signals from the one or more sensors and output image data, and, a display mounted on a display arm extending from the frame connector, the display configured to display images based on the image data. The goggles frame is configured to releasably receive the frame connector. The display is located within a field of view of a user wearing the goggles frame when the frame connector is received by the goggles frame.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings show non limiting example embodiments.

FIGS. 2A and 2B are sectional views taken along lines A-A and B-B of FIG. 2, respectively.

FIG. 2C is a rear view of the goggle frame of FIG. 2.

Throughout the drawings and description like reference symbols are used to indicate like elements.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

INTERPRETATION OF TERMS

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Figure 11:
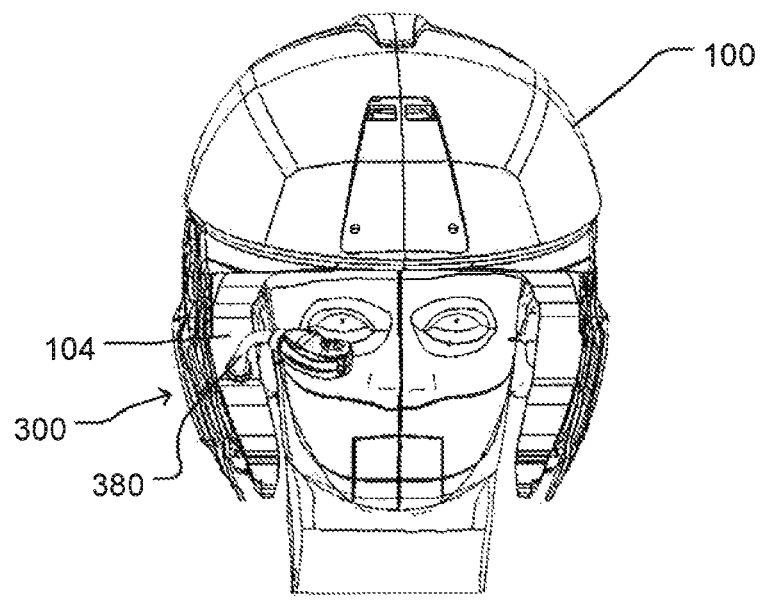
FIG. 11 is a front view of another embodiment of the modular HUD system with a helmet.

Certain embodiments of the invention provide modular head-mounted information and display systems which may be removably coupled to headgear such as goggles, helmets or the like. Some embodiments provide modular head-mounted systems which are adjustable to accommodate installation in a variety of sizes and shapes of headgear. The following paragraphs discuss example embodiments as shown in FIGS. 1 to 10 comprising modular head-mounted systems for installation in alpine goggles adapted to receive the modular system, but it is to be understood that other embodiments may provide modular head-mounted systems for use with other types of headgear adapted to receive such systems. For example, certain embodiments provide modular head-mounted systems for helmets, as described below with reference to FIG. 11.

Figure 1:
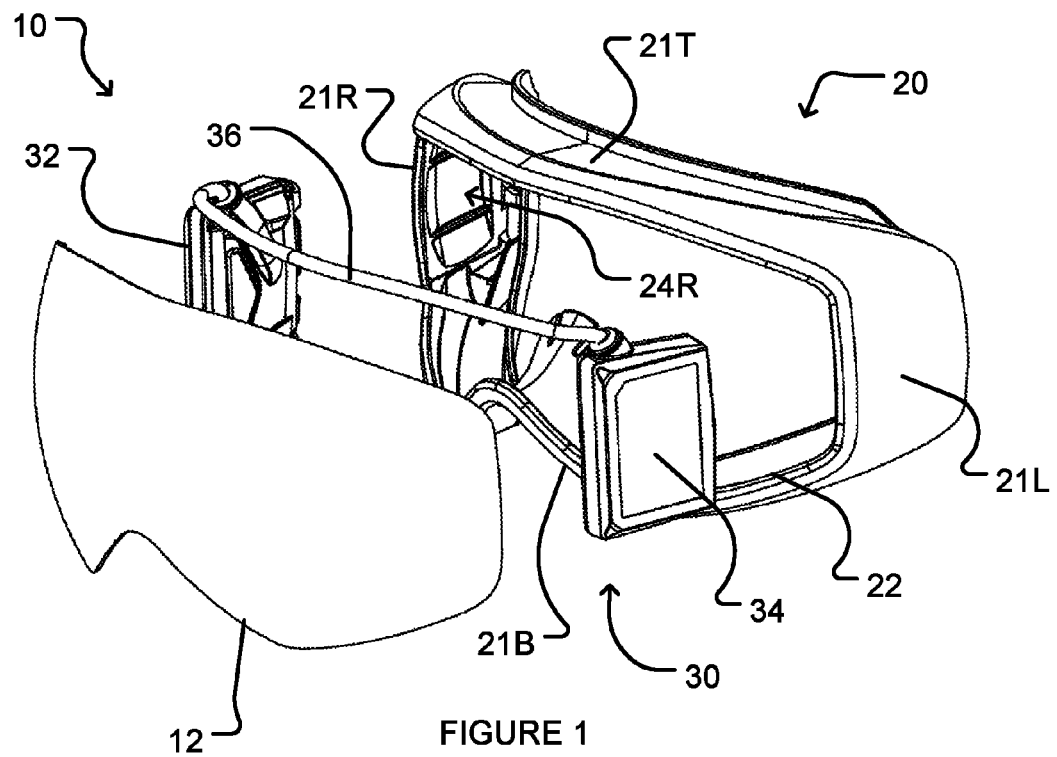
FIG. 1 is an isometric exploded view of goggles with a modular Heads-Up Display (HUD) system according to an example embodiment.

FIG. 1 shows a pair of goggles 10 and a modular Heads-Up Display (HUD) system 30 according to an example embodiment. Goggles 10 are adapted to removably receive HUD system 30. Goggles 10 may be configured to be fully functional with or without HUD system 30 installed. Such a configuration permits goggles 10 to be sold separately from HUD system 30. Further, a user may have a single HUD system 30 for a variety of goggle frames 20, and select the desired frame for use with the HUD system. Also, since HUD system 30 is removable, a user may readily maintain, repair, upgrade, etc. HUD system 30 as necessary or desired.

Goggles 10 comprise a frame 20 which holds a lens assembly 12. Lens assembly 12 may comprise, for example, a cylindrical dual lens with a silicone seal, with an airtight space between the lenses to reduce fogging. The lenses may both have a 6-inch (15.25 cm) radial base curvature. The lenses may be coated with an anti-fog sealant. Lens assembly 12 may also comprise any other type of single or dual lens assembly. The illustrated embodiment does not include ventilation holes in lens assembly 12, but lens assembly 12 may be ventilated in some embodiments. Frame 20 may also include a standard ventilation system (not shown) as known in the art. Frame 20 of goggles 10 is adapted to receive lens assembly 12 and HUD system 30. In some embodiments, HUD system 30 is retained in frame 20 by snap-fit means as described below such that HUD system 30 may quickly and easily be installed or removed from goggles 10. As used herein, the term "snap-fit" refers to any releasable connection which is formed at least in part by resilient deformation in one of the connecting components. Such resilient deformation may be relieved once the snap-fit connection is made.

HUD system 30 can be used by skiers or snowboarders or other athletes to increase the usefulness of their goggles. As discussed further below, HUD system may sense various types of motion and other parameters and provide a user with real time information such as their position, their performance (e.g. speed, airtime, direction), video, etc. In some embodiments, once installed, HUD system 30 is fully contained within the goggle frame 20 and therefore does not interfere with the regular activities of a user.

In some embodiments, HUD system 30 may be installed by removing lens assembly 12, inserting HUD system through the front of frame 20 into recesses defined therein, and replacing lens assembly 12. In some embodiments, HUD system 30 may be installed without removing lens assembly 12 by inserting HUD system from the rear of frame 20 into recesses defined therein.

FIGS. 2, 2A, 2B and 2C show frame 20 in isolation. Frame 20 comprises left and right side portions or "outriggers" 21L and 21R, a top portion or "bridge" 21T and a bottom portion 21B. Outriggers 21L and 21R may have slots or other features (not shown) configured to facilitate attachment of a strap or the like (not shown) to hold goggles 10 in place on a user's head as known in the art. Frame 20 has a lens opening 22 on a forward side thereof adapted to receive lens assembly 12. Frame 20 has a facial flange 23 on a rearward side thereof adapted to press against a user's face when worn. Facial flange 23 may have padding or the like (not shown) thereon to abut the user's face as known in the art. Terms such as left, right, up, down, front, back and the like are used to refer to the perspective of a user wearing goggles 10. In some embodiments frame 20 has a substantially unitary construction of a deformable resilient material. In some embodiments frame 20 may be constructed from two or more pieces joined together.

Frame 20 comprises recesses 24L and 24R in left and right outriggers 21L and 21R. Recesses 24L and 24R are shaped to receive components of HUD system 30. In the illustrated example, recess 24R receives an electronics compartment 32 which houses a processor, memory and sensors, and recess 24L receives a power compartment 34 which houses a battery pack or other power source, as described further below. In other embodiments, the locations of electronics compartment 32 and power compartment 34 may be reversed, or components of HUD system may be differently distributed between compartments received in recesses 24L and 24R. In some embodiments, frame 20 may have one or more ribs 25 protruding into recesses 24L and 24R. Ribs 25 may, for example, bear against the sides of compartments 34 and 32 to hold them in place in recesses 24L and 24R. In some embodiments, compartments 34 and 32 may have corresponding features (not shown) on the outer sides thereof configured to be engaged by ribs 25.

Figure 2:
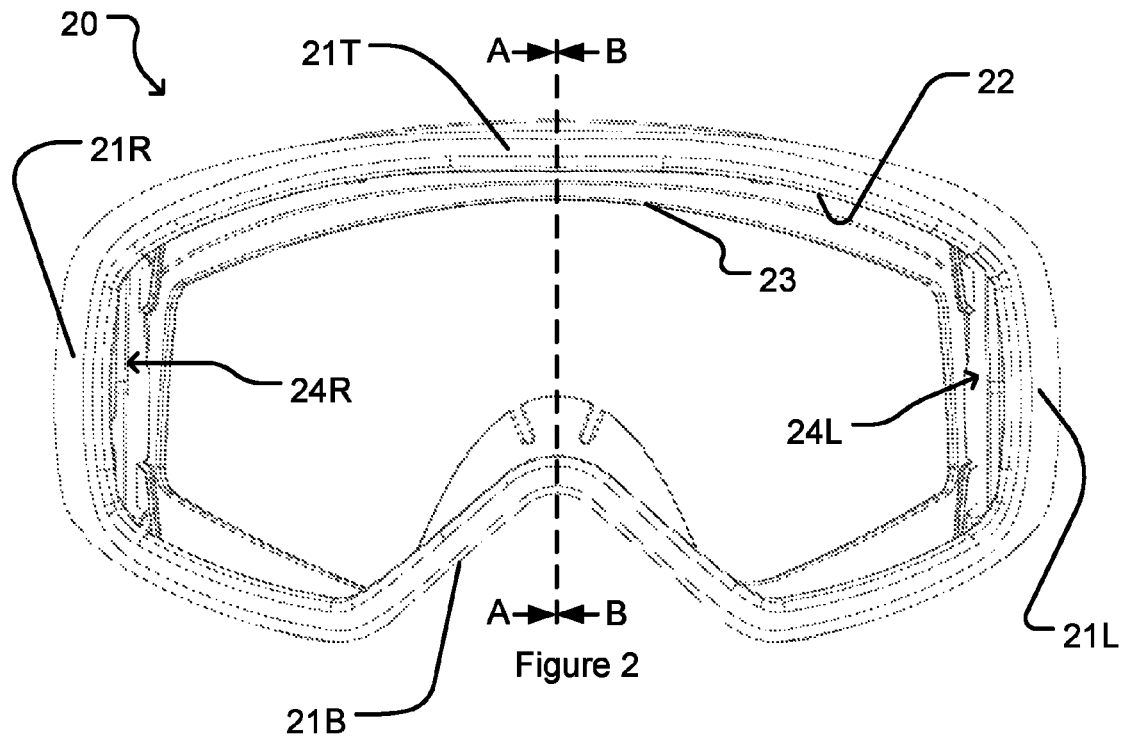
FIG. 2 is a front view of the goggle frame of FIG. 1.
Figure 2A:
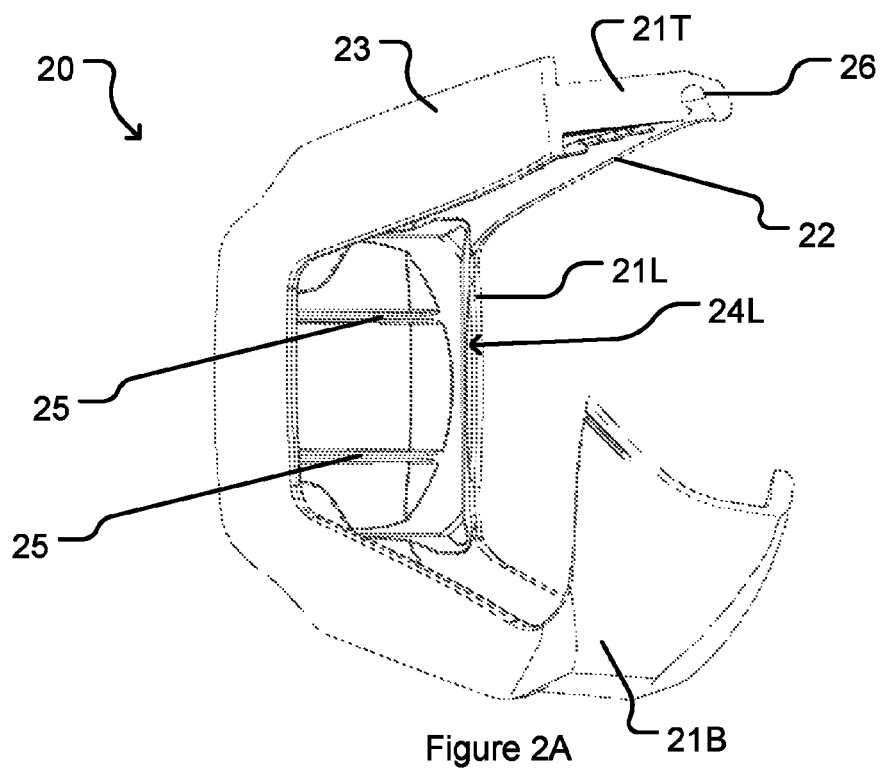

As best seen in FIGS. 2A and 2B, in the illustrated example frame 20 comprises a channel 26 defined in top portion 21T. Channel 26 extends between recesses 24L and 24R and is configured to receive a cable 36 connecting compartments 32 and 34. Cable 36 may, for example, be snap-fit into channel 26 in some embodiments. In some embodiments, cable 36 may be adjustable in length, as described below with reference to FIGS. 4A and 4B. In some embodiments, channel 26 may have a waviness selected based on the size of frame 20, as described below with reference to FIGS. 4C and 4D, such that HUD systems having cables of the same length may be used for different sizes of goggles or HUD systems with adjustable length cables may be used with a wider range of sizes of goggles. In some embodiments, channel 26 may be significantly wider than cable 36 in order to receive a wavy or spiraled/coiled stretchable cable, and cable 36 may be held in place in channel 26 by clips, resilient flaps or other retaining means as described below with reference to FIGS. 4E and 4F. For example, in order for HUD system 30 to be installed in smaller goggles, in some embodiments channel 26 may be wide enough to permit cable 36 to "snake" back and forth between the sides of channel 36, such that HUD systems having cables of the same length may be used for different sizes of goggles or HUD systems with adjustable length cables may be used with a wider range of sizes of goggles. In some embodiments, a channel between recesses similar to any of those described herein may be formed in bottom portion 21B instead of top portion 21T.

As best seen in FIG. 2C, in the illustrated embodiment frame 20 comprises a communications port opening 27 and a power button opening 28 in the rear of outrigger 21R. Communications port opening 27 and power button opening 28 provide access to a communications port 77 and a power button 78 on electronics compartment 32 as described below. When HUD system 30 is not installed in goggles 10, communications port opening 27 and power button opening 28 may be covered with one or more plugs, flaps, or the like (not shown).

As best seen in FIG. 2C, in the illustrated embodiment frame 20 comprises snap-fit openings 29L and 29R in bottom portions of outriggers 21L and 21R. Snap-fit openings 29L and 29R communicate with recesses 24L and 24R and are configured to receive protrusions 39L and 39R on compartments 34 and 32, respectively, as described further below. In other embodiments, protrusions 39L and 39R may be received in indentations in the lower walls of recesses 24L and 24R which do not extend through frame 20.

Figure 3:
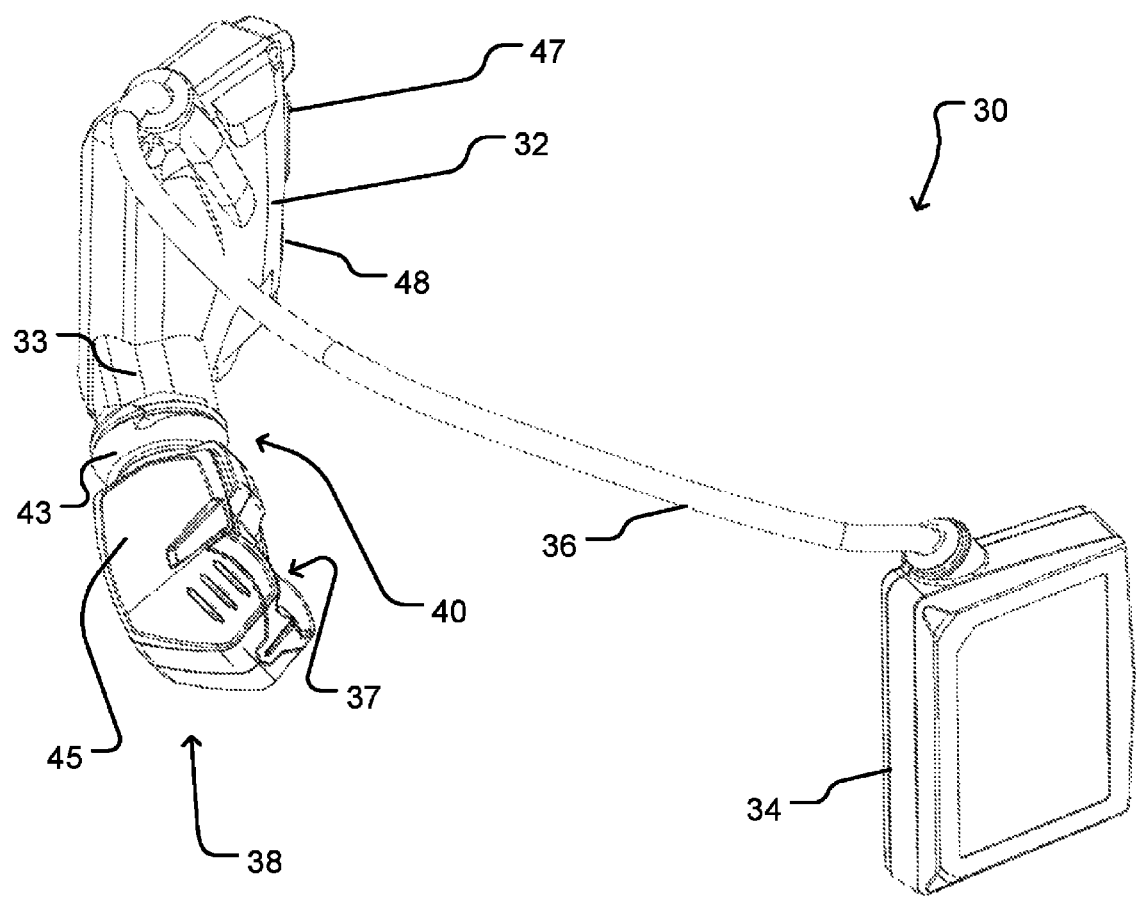
FIG. 3 is a perspective view of an embodiment of the modular HUD system of FIG. 1.
Figure 3A:
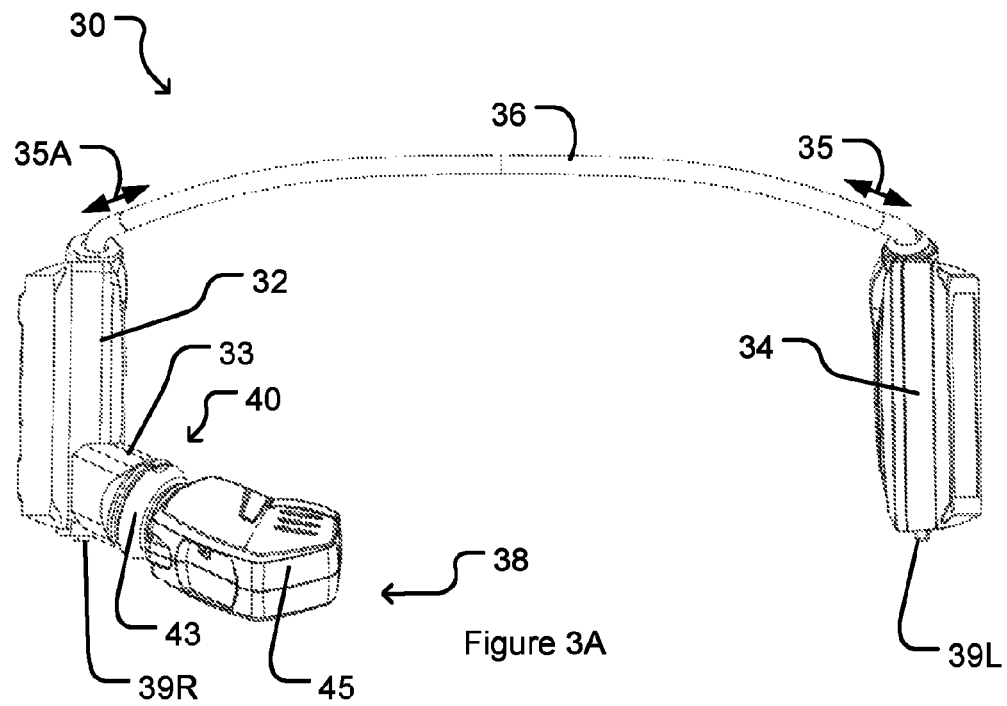
FIG. 3A is a front view of an embodiment of the modular HUD system of FIG. 1.
Figure 3B:
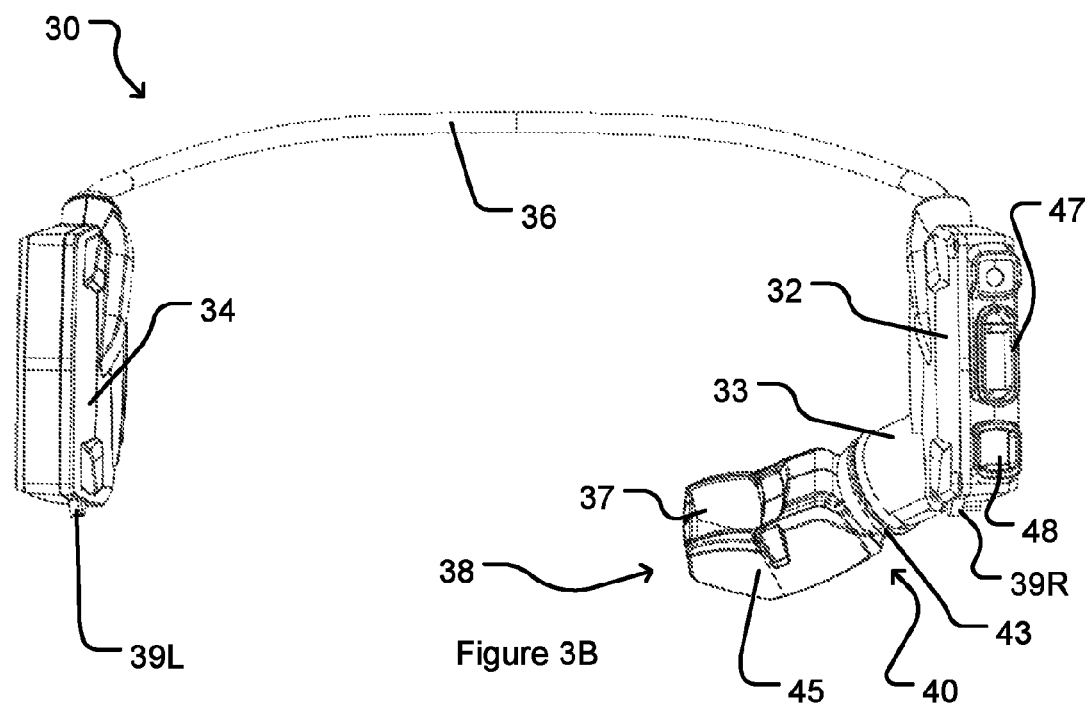
FIG. 3B is a rear view of an embodiment of the modular HUD system of FIG. 1.
Figure 4A:
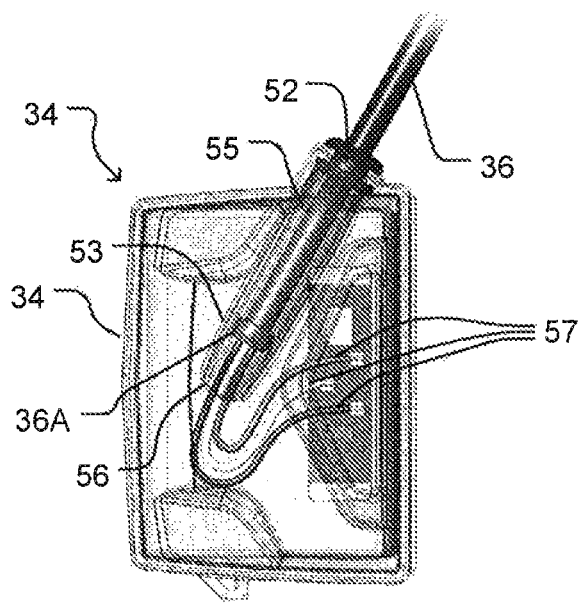
FIGS. 4A and 4B are side views of a portion of an embodiment of the goggles and the modular HUD system of FIG. 1.
Figure 4B:
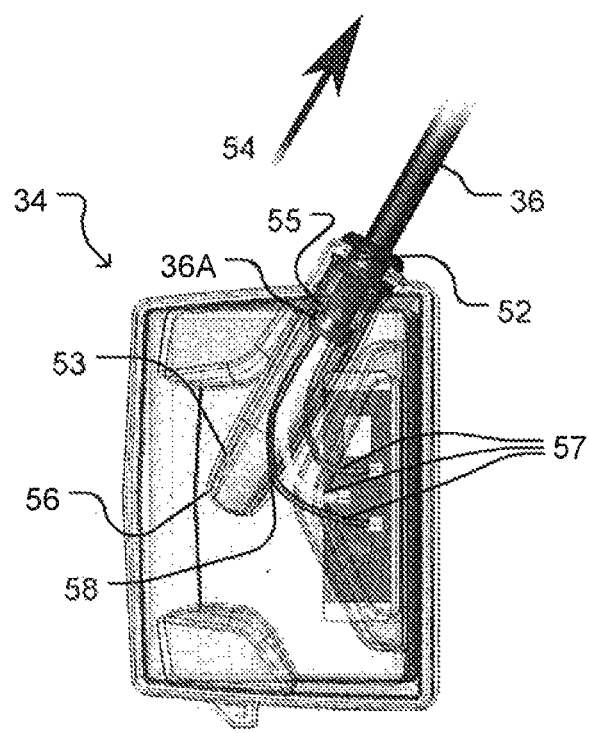

FIGS. 3, 3A and 3B show HUD system 30 in isolation. HUD system 30 comprises an electronics compartment 32 and a power compartment 34 connected by a cable 36. Cable 36 may, for example, comprise one or more electrical conductors surrounded by suitable insulation for transferring electrical power and possibly other signals such as control signals between compartments 32 and 34. Cable 36 may be adjustable in length such that HUD system 30 can be used with a variety of sizes of goggles. For example, in some embodiments, cable 36 may be wavy or spiraled such that it may extend through resilient straightening of the cable. In other embodiments cable 36 may be longitudinally adjustably coupled to power compartment 34, as indicated by arrow 35 in FIG. 3A. Alternatively or additionally, cable 36 may be longitudinally adjustably coupled to electronics compartment 32, as indicated by arrow 35A in FIG. 3A. Adjustability of cable 36 may, as shown for example in FIG. 4A, be provided by having cable 36 slidably received in an opening 52 of power compartment 34 (and/or electronics compartment 32) which is sized to accommodate the insulation of cable 36, and by providing an anchor 36A coupled to the insulation of cable 36 which is larger than the opening 52 in the compartment, with a chamber 53 inside of the compartment to allow movement of the anchor. When cable 36 is pulled in direction 54, anchor 36A contacts stop 55 of chamber 53 (see FIG. 4B). In FIG. 4B stop 45 is positioned within chamber 53, in other embodiments stop 55 may be positioned at or near opening 52. Chamber 53 also has a bottom 56 which may prevent cable 36 from being inserted too far into compartment 34 (or 32) and damaging wires 57. Chamber 53 may also have a slot 58, which allows wires 57 to move when cable 36 is adjusted as seen in FIG. 4B compared to FIG. 4A.

In other embodiments, chamber 53 may have a second stop (not shown) in addition to, or alternative to, bottom 56 to prevent cable 36 from over-insertion into the compartment. In other embodiments, compartment 34 (and/or 32) may have a guide to guide cable 36 into the compartment. This guide may, for example, comprise two stops to prevent removal and over-insertion of cable 36 into the compartment. These stops may function in conjunction with two anchors on cable 36 to restrict movement of cable 36 relative to the compartment.

Figure 4C:
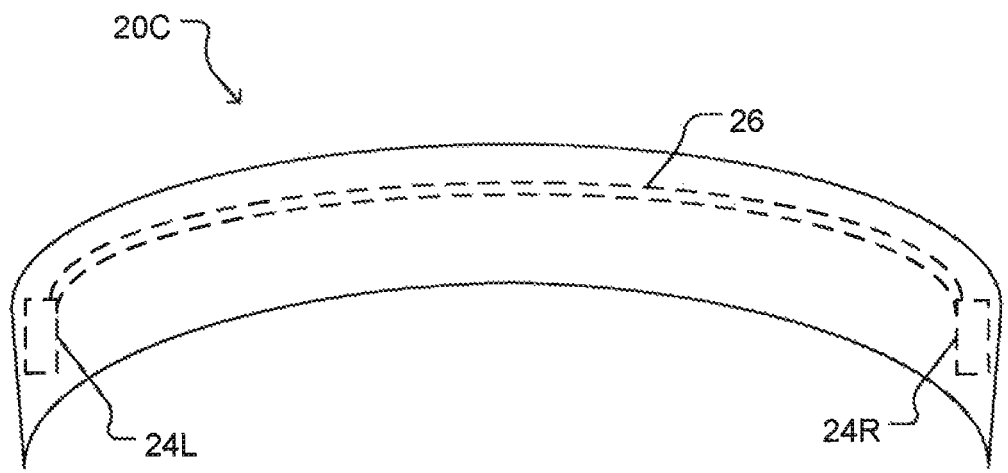
FIGS. 4C to 4F are top views schematically illustrating channels between recesses in goggles frames adapted to receive HUD systems according to various embodiments.
Figure 4D:
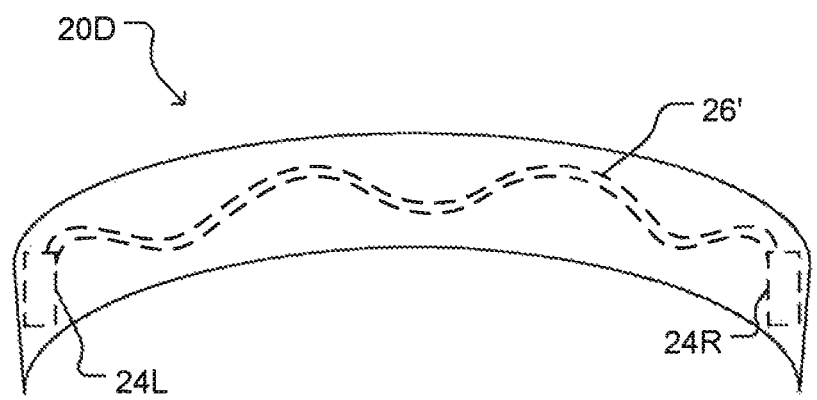

FIGS. 4C and 4D respectively schematically illustrate example embodiments of a larger-sized frame 20C and a smaller-sized frame 20D which are adapted to receive HUD system 30. Both of frames 20C and 20D have recesses 24L and 24R in side portions thereof configured to accept compartments 32 and 34 of HUD system 30 as described above. Due to the larger size of frame 20C, the distance between recesses 24L and 24R in frame 20C is greater than the distance between recesses 24L and 24R in frame 20D. Channel 26 in frame 20C follows a substantially smooth arcing path between recesses 24L and 24R. In some embodiments, cable 36 of HUD system 30 may not have sufficient adjustability in length to fit in a smoothly arcing channel between recesses 24L and 24R of Frame 20D. Accordingly, in frame 20D channel 26' follows a wavy path between recesses 24L and 24R, such that the length of channel 26' is within a length adjustability range of cable 36. In some embodiments, the waviness of the channel between recesses 24L and 24R may be selected based on the distance between recesses 24L and 24R to ensure that the length of the channel is within the length adjustability range of cable 36.

Figure 4E:
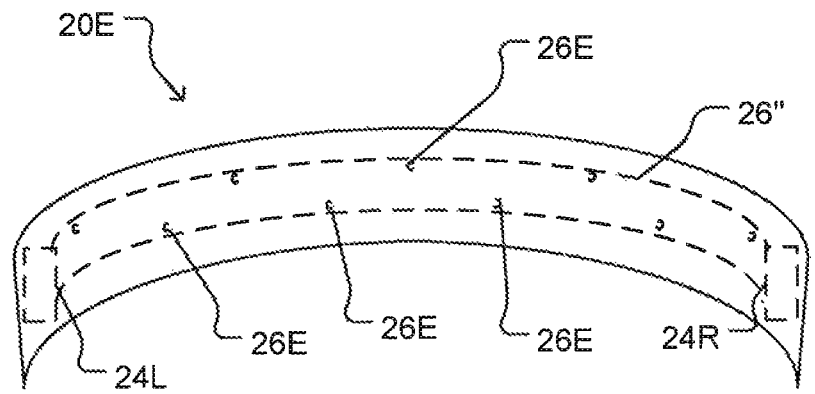
Figure 4F:
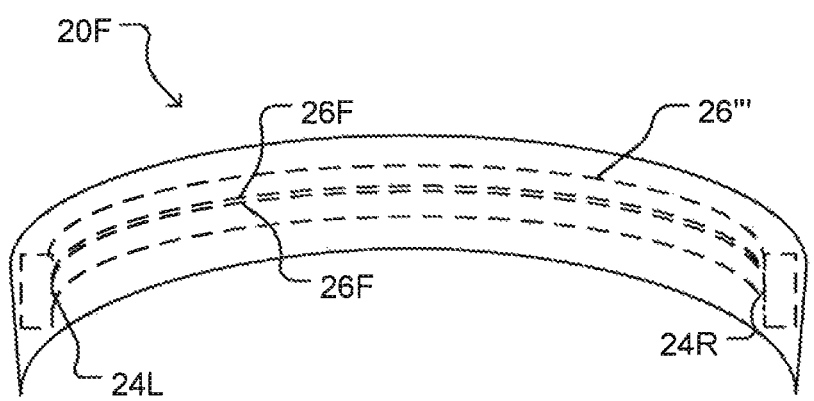

FIGS. 4E and 4F schematically illustrate example embodiments of frames 20E and 20F adapted to receive HUD system 30. Frames 20E and 20F respectively comprise channels 26" and 26'" which are significantly wider than cable 36. Frame 20E comprises clips 26E spaced apart along opposite sides of channel 26" for holding cable 36, such that cable 36 may be made to "snake" back and forth across channel 26". Frame 20F comprises resilient flaps 26F which extend across the opening of channel 26'" (the opening may be on the underside of channel 26'" when channel 26'" is formed in top portion 21T, or on the upper side of channel 26'" when channel 26'" is formed in bottom portion 21B) from opposite sides thereof. The gap between flaps 26F may be smaller than the diameter of cable 36. Flaps 26F may be deformed to permit cable 36 to be inserted into channel 26'" and return to their normal position extending across the opening of channel 26'" to keep cable 36 therein. Flaps 26F may, for example, be constructed from foam, plastic, rubber, or other materials.

Figure 1A:
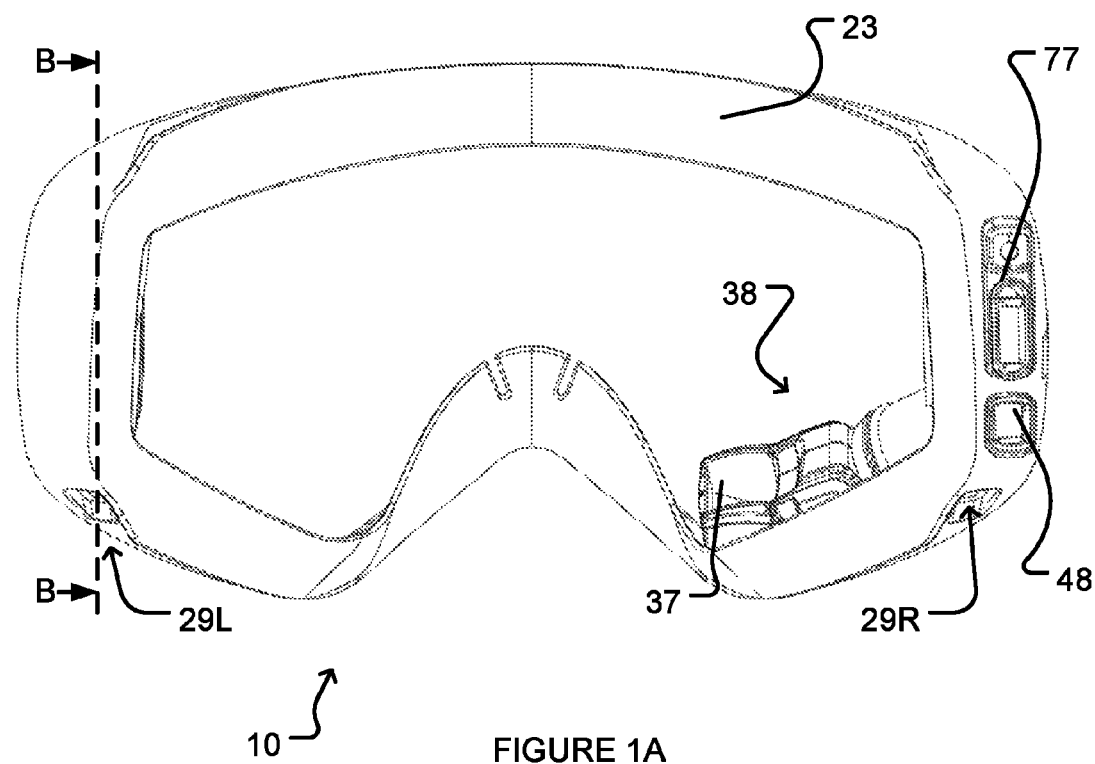
FIG. 1A is a rear view of the goggles of FIG. 1 with the HUD system installed therein.

Returning to FIG. 1A, a display 37 is mounted on a display arm 38. Display 37 may comprise, for example, a Quarter Video Graphics Array (QVGA) having a 320×240 resolution and 16 bit colors. In some embodiments, display 37 may comprise, a micro LCD illuminated by a suitable backlight. In other embodiments, other types of displays may be used, such as, for example, LED or OLED displays, electroluminescent (EL) displays, or the like. In some embodiments, instead of a display mounted on an arm, a projector may be configured to project information to be displayed onto the lens. The projector may, for example, be positioned to project information to be displayed onto a portion of the lens near the edge of the user's field of view.

Display arm 38 extends forward and inwardly from electronics compartment 32 such that display is located generally below the right eye of a user wearing goggles with HUD system installed. Display arm 38 may be adjustable such that the precise position of display 37 with respect to the user's eye may be adjusted to accommodate installation in a variety of shapes of goggles and according to user preference. In the illustrated embodiment, display arm 38 comprises a ball and socket joint 40 (see FIG. 3) as described below. In other embodiments display arm 38 may comprise other means for adjusting the position of display 37 with respect to electronics compartment 32. For example, in some embodiments display arm 38 may be adjustable through the use of two or three uni-directional joints to allow the display 37 to be adjusted in three dimensions. In other embodiments, display arm 38 may be adjustable through a flexible or deformable arm such as those found on some headset microphones. Display arm 38 may also be covered in a protective or cushioned sleeve (not shown) in some embodiment. Such sleeves can provide some protection against painful or dangerous collisions between the display arm and a user's face in the event of a crash or fall.

Figures 5, 5A:
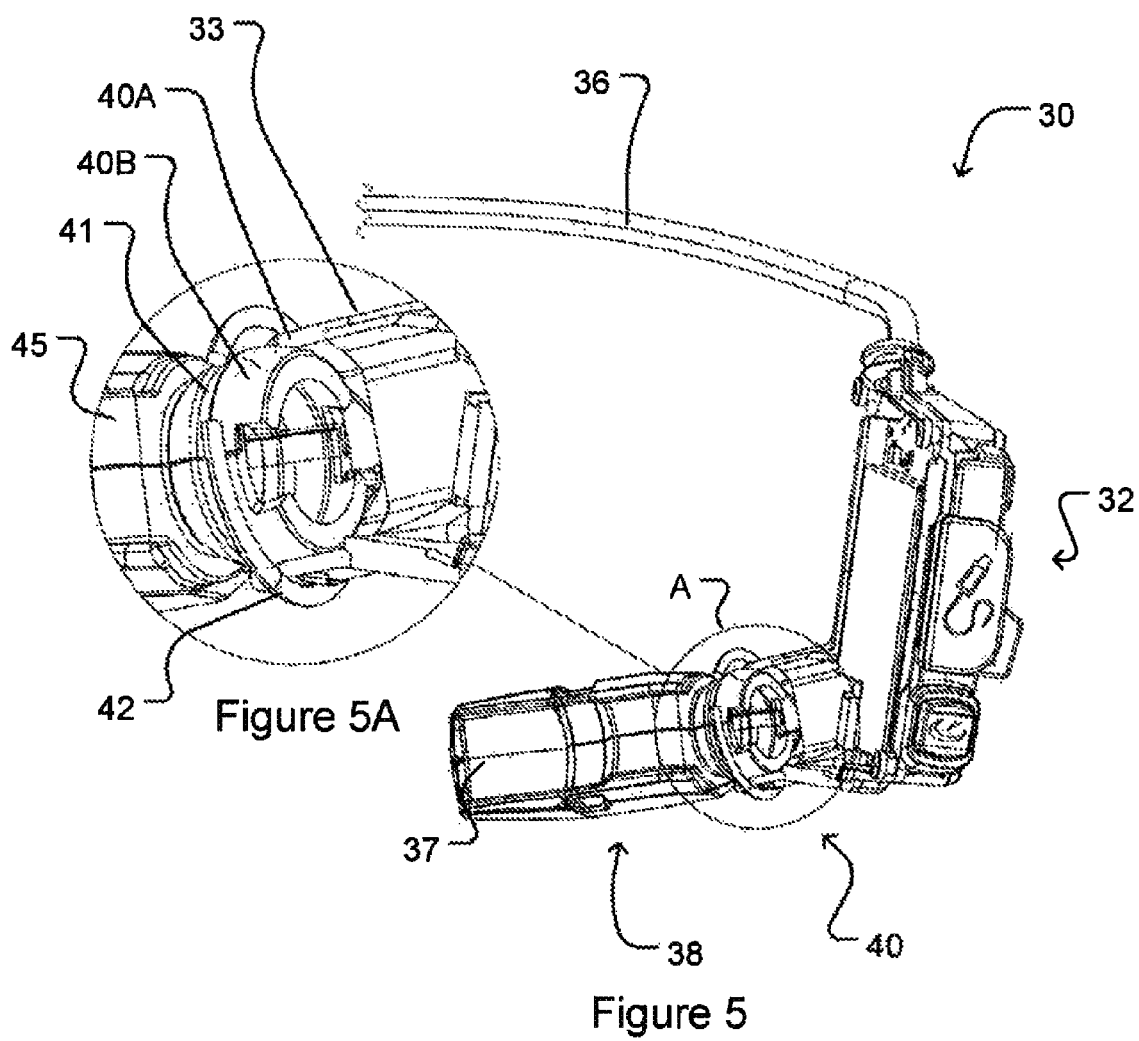
FIG. 5 shows a partial view of an embodiment of the modular HUD system of FIG. 1.
FIG. 5A is an enlarged view of the area shown in circle A in FIG. 4.

As best seen in FIGS. 5 and 5A, in the illustrated embodiment display arm 38 comprises an extension 33 projecting from electronics compartment 32 which forms a socket 40A at the end thereof, and an optical enclosure 45 having a ball 40B thereon which engages socket 40A to make up ball joint 40. A groove 41 defined in ball 40B is configured to receive an O-ring 42 for sealing ball joint 40. A cover 43 (see FIGS. 3, 3A, 3B) may be provided over ball joint 40 to prevent dust or debris from entering ball joint 40.

Figures 6A, 6B:
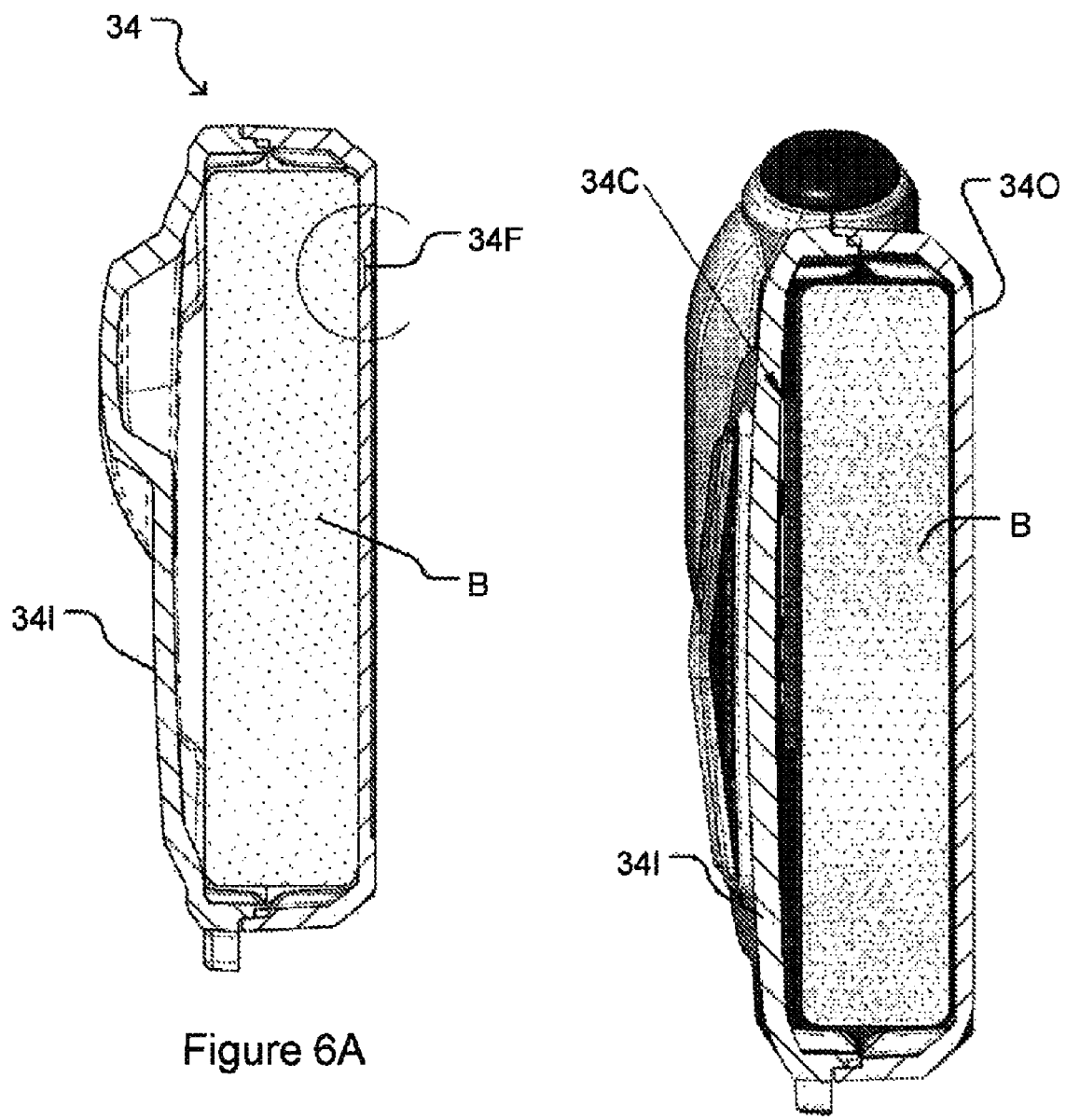
FIGS. 6A and 6B are cross-section views of a component of an embodiment of the modular HUD system of FIG. 1.

In some embodiments, power compartment 34 may have battery failure protection features. In some cases, battery failure due to impact, wear, rapid oxidation, etc. may cause a battery to bulge or rupture within power compartment 34. As a result, as shown in FIG. 6A, power compartment 34 may have a failure element 34F defined in an outer wall 340 of power compartment 34. Outer wall 340 is opposite to a user's head when modular HUD system 30 is installed and worn. Failure element 34F may be a thin wall portion which encourages outer wall 340 to fail at that location if battery B bulges or ruptures within power compartment 34. As a result, failure element 34F may prevent a failure of inner wall 341, which may be proximate a user's head, and may prevent any hazard that could result from such a failure, such as impact or pressure on a user's head, or leaking of battery fluid onto a user's head.

Power compartment 34 may also have a battery protection circuit 34C as shown in FIG. 6B. Battery protection circuit 34C may comprise any form of battery protection circuit known in the art. Battery protection circuit 34C is located between battery B and inner wall 341. This may provide some protection should battery B fail through the outer wall 340.

Figures 1B, 1C:
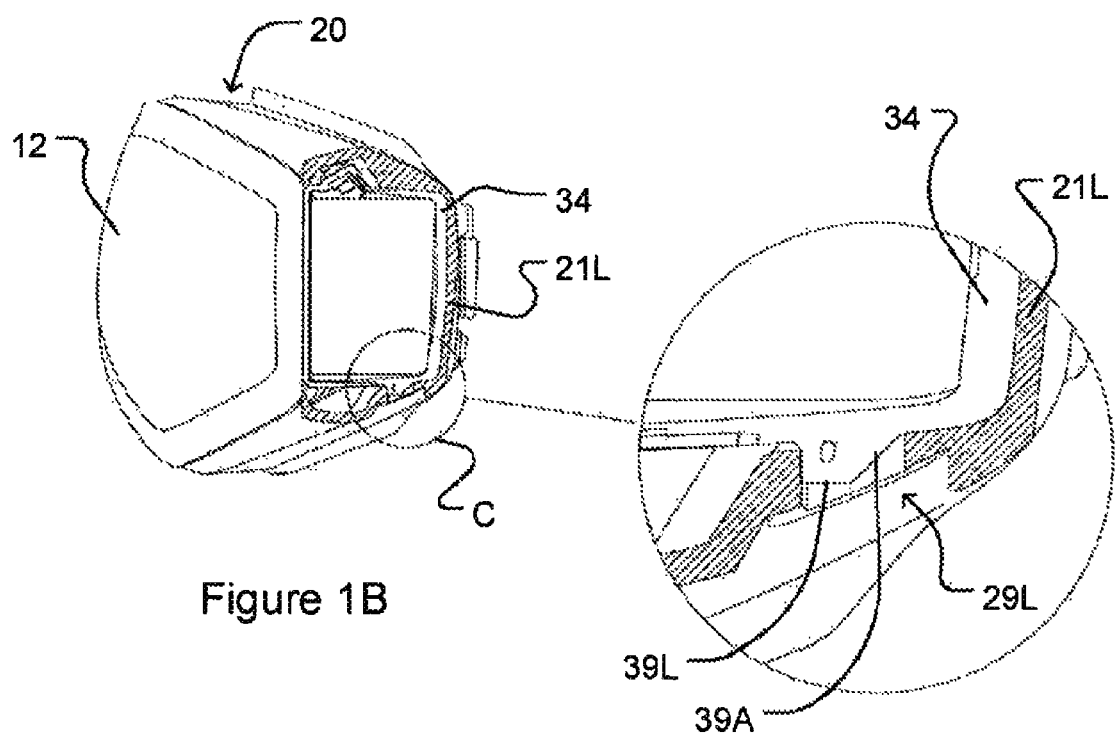
FIG. 1B is a sectional view taken along line B-B of FIG. 1A.
FIG. 1C is an enlarged view of the area shown in circle C of FIG. 1B.

Compartments 32 and 34 respectively have snap-fit protrusions 39R and 39L on the bottom thereof positioned to engage snap-fit openings 29R and 29L of frame 20 when compartments 32 and 34 are received in recesses 24R and 24L. Each of protrusions 39R and 39L may have an angled portion 39A (see FIGS. 1B and 1C, which show angled portion 39A of protrusion 39L, and FIG. 7, which shows angled portion 39A of protrusion 39R) which facilitates insertion of the respective compartments 32 and 34 into recess 24R and 24L. Angled portions 39A provide an appropriate entrance angle which allows, along with some resilient deformation, for the protrusions 39R and 39L to snap into openings 29R and 29L, securing the modular HUD system 30 to the goggle frame 20 in a snap-fit assembly. In the illustrated embodiment, openings 29R and 29L pass through the base of goggle frame 20 such that a user may engage protrusions 39R and 39L therethrough to release the snap-fit connection and remove HUD system 30 from goggles 10.

Figure 7:
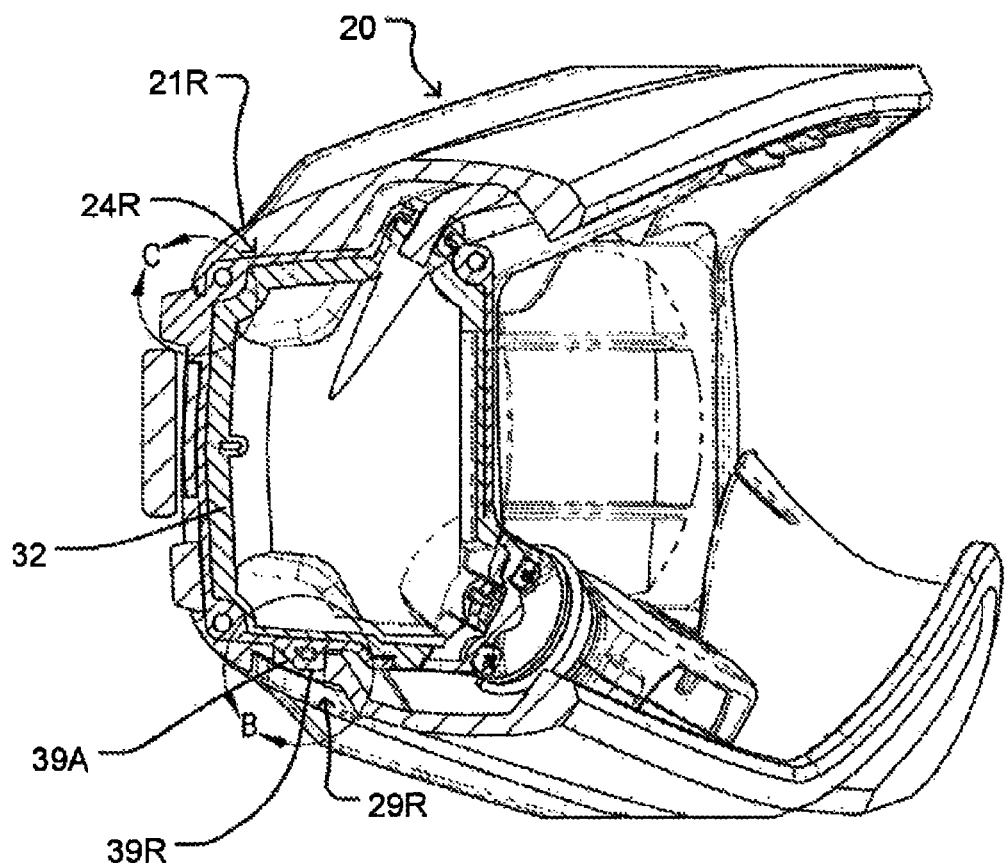
FIG. 7 is a cross-section side view of an embodiment of the goggles and the modular HUD system of FIG. 1.
Figure 7A:
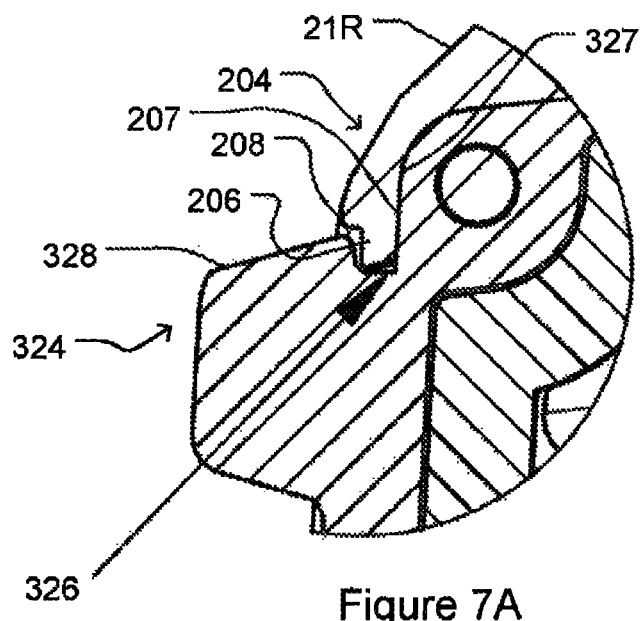
FIG. 7A is an enlarged view of the area shown in circle C of FIG. 7.

Electronics compartment 32 may also have an upper retainer 324, as best seen in FIG. 7A. Upper retainer 324 may engage a frame retainer 204 of frame 20 to provide a releasable coupling between electronics compartment 32 and frame 20. In the FIG. 7A embodiment, upper retainer 324 comprises a recess 326, retaining wall 327 and angled face 328. Frame retainer 204 may have a projection 206, a retaining face 207, and a lip 208. Upper retainer 324 may engage frame retainer 204 by sliding angled face 328 past projection 206 until projection 206 engages recess 326 in a snap-fit. Once projection 206 has entered recess 326, lip 208 is proximate to, or may rest on, angled face 328. Upper retainer 324 is constrained by frame retainer 204 by interaction of retaining wall 327 with retaining face 207 and by interaction of recess 326 with projection 206. Angled face 328 may extend past the rear of outrigger 21R of frame 20, so as to be accessible from the rear (user facing) side of frame 20, to enable the user to remove compartment 32 from frame 20 by applying suitably directed pressure to upper retainer 324. Each of upper retainer 324 and frame retainer 204 may be resiliently deformable such that electronics compartment 32 may be disengaged from frame 20 by application of pressure to angled face 328 or lip 207 or thereabouts. In some embodiments, power compartment 34 and frame 20 may additionally or alternatively have a similar upper retainer 324 and frame retainer 204.

In other embodiments, other connection features may be used to couple HUD system 30 to frame 20. For example, frame 20 may comprise keyhole slots in the outrigger portions which are adapted to slidingly and/or snapingly receive protrusions or "keys" on components of modular HUD system 30. In another example, recesses 24L and 24R may comprise hinged doors or other moveable members which secure components of modular HUD system 30 to frame 20 once inserted.

Figure 8:
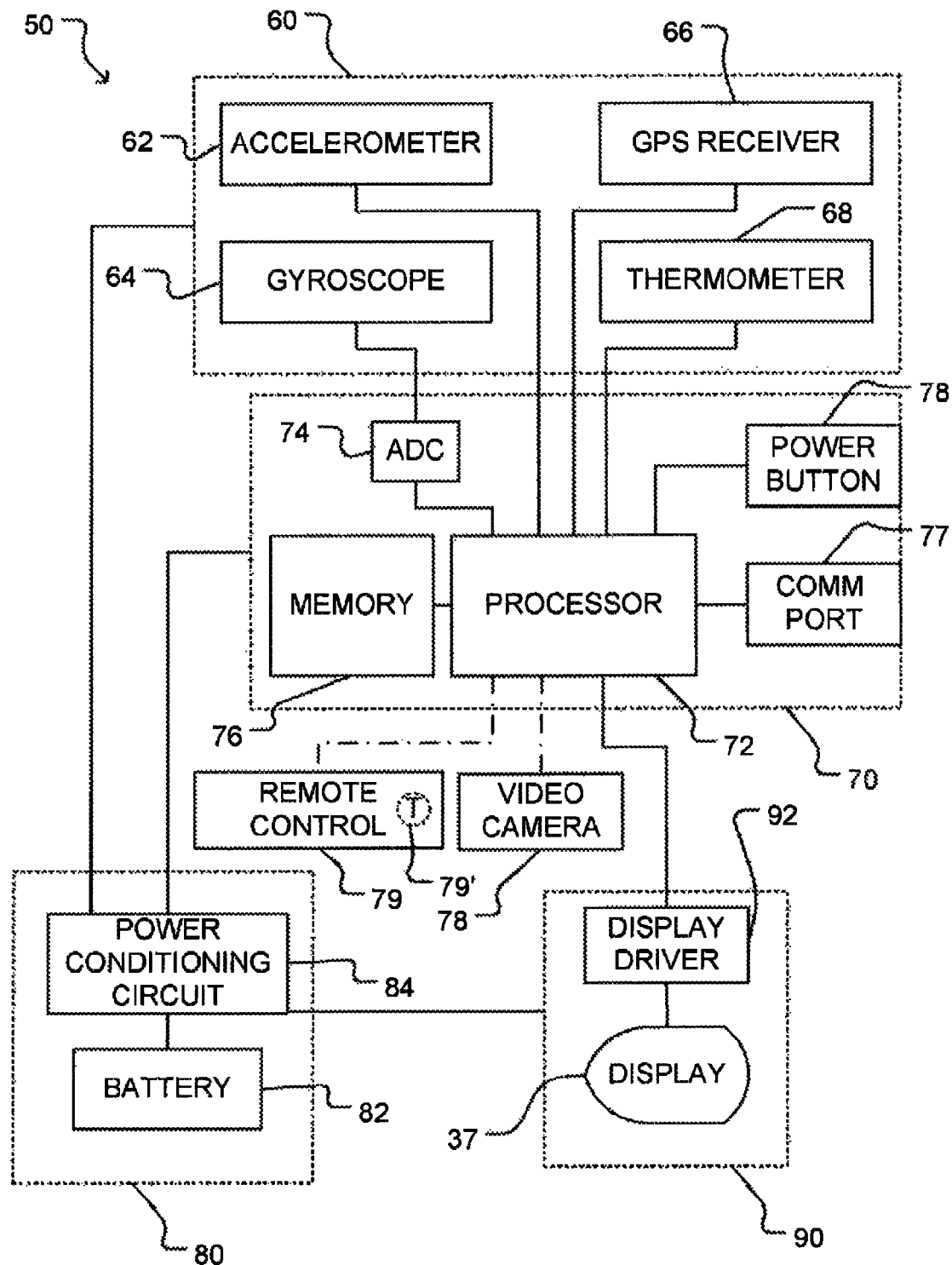
FIG. 8 is a block diagram of electronic components of a modular HUD system according to another embodiment of the invention.

FIG. 8 shows an example embodiment of an electronic system 50 suitable for use with a modular HUD system as described above. Electronic system 50 comprises sensor unit 60, processor unit 70, power unit 80 and display unit 90. With reference to the example HUD system 30 described above, sensor unit 60 and processor unit 70 may, for example, be contained in electronics compartment 32, power unit 80 may, for example, be substantially contained in power compartment 34, and display unit 90 may, for example, be substantially contained in optical enclosure 45.

In the illustrated embodiment, sensor unit 60 comprises a 3-axis accelerometer 62, a 3-axis gyroscope 64, a GPS receiver 66, and a thermometer 68. Accelerometer 62 and gyroscope 64 are collectively referred to herein as "INS" (inertial navigation system) sensors. The INS sensors 62, 64 and GPS receiver 66 have complementary strengths and weaknesses such that their combined use provides for improved reliability and accuracy of measurement of position and altitude as compared to each sensor on its own.

Accelerometer 62 may comprise, for example, a micro-electro-mechanical system (MEMS) device which produces digital output signals representative of linear accelerations along three perpendicular axes. In some embodiments, accelerometer 62 may comprise a LIS331DL motion sensor manufactured by STMicroelectonics.

Gyroscope 64 may comprise, for example, two MEMS devices, one of which produces analog output signals representative of angular velocities about two perpendicular axes, and one of which produces an analog output signal about a third axis perpendicular to the other two axes. In some embodiments, gyroscope 64 may comprise an IDG-500 for measuring angular velocities about an x-axis and a y-axis, and an ISZ-500 for measuring angular velocity about a z-axis, both of which are manufactured by InvenSense, Inc.

GPS receiver 66 may comprise, for example a Wide Area Augmentation System (WAAS) enabled GPS receiver with a built-in system clock. GPS receiver 66 may, for example, output digital signals using a protocol such as NMEA 0183 or NMEA 2000. Thermometer 68 may comprise, for example, a digital thermometer.

Processor unit 70 comprises a processor 72 which is connected to receive signals from accelerometer 62, gyroscope 64, GPS receiver 66 and thermometer 68 of sensor unit 60. Processor unit 70 may comprise an analog-to-digital converter (ADC) 74 connected between processor 72 and any of the sensors of sensor unit 60 which produce analog signals. In the illustrated embodiment, all sensors of sensor unit 60 except gyroscope 64 have digital outputs, so ADC 64 is connected only between gyroscope 64 and processor 62.

In the illustrated embodiment, processor unit 70 also comprises a memory 76. Memory 76 may comprise volatile and/or non volatile memory such as RAM, ROM, or other types of memory. Memory 76 may also comprise a removable media such as a USB drive, SD or miniSD card, etc. Memory 76 has stored therein various computer readable instructions for use by processor 72. In other embodiments, memory 76 may be integrated into processor 72.

Processor 72 may also be coupled to communications port 77 and power button 78. Communications port 77 may be accessible to a user and comprise one or more interfaces for wired or wireless communication with external devices. Communications port 77 may, for example, comprise one or more USB, Firewire, or other interfaces. Communications port 77 may also comprise an interface for connecting to a video camera in some embodiments. Power button 78 may also be accessible to the user and operable to turn electronic system 50 on and off.

Processor unit 70 may also send and receive information from other devices such as mobile phones, personal computers, other modular HUD systems, etc. For example, processor 72 may receive images or video from a video camera 94 and send the same via an appropriate communications method. For example, in some embodiments processor 72 may control display 37 to act as a viewfinder for video camera 94 by displaying live images from video camera 94. Display of live images from camera 94 on display 37 may facilitate users capturing of intended scenes by providing feedback to users as to where camera 94 is pointing. Processor 72 may also cause display 37 to display stored images captured with video camera 94. Video camera 94 may be configured to capture both still and moving images in some embodiments. Video camera 94 may be physically connected to electronic system 50 or may be wirelessly connected through a Bluetooth communication protocol or other suitable communications methods. Processor 72 may also receive input commands from a remote control 79. Remote control 79 may be wirelessly connected to processor unit 70 and may comprise a wireless watch-type remote or be integrated into a user's gloves or mitts for example. Remote control 79 may also be integrated into video camera 94 in some embodiments.

In some embodiments, remote control 79 may include a thermometer 79', and remote control 79 may be configured to transmit temperature readings taken by thermometer 79' to processor unit 70. Providing temperature readings taken by thermometer 79' in remote control 79 may provide for simplified temperature calibration in some embodiments, since remote control 79 may not be susceptible to as many thermal disturbances as thermometer 68 of sensor unit 60, which is typically located close to the user's head and may be covered by a hat or other articles. Providing thermometer 79' in remote control 79 may thus improve the accuracy of temperature readings in some embodiments. In some embodiments, thermometer 79' may be used in conjunction with thermometer 68 of sensor unit 60. In some embodiments, thermometer 68 of sensor unit 60 may be omitted, and thermometer 79' may provide the only temperature readings to processor unit 70.

Processor 72 is configured to transform signals received from sensor unit 60 to produce outputs representing various parameters relating to user performance, and other outputs, as discussed below. For example, processor 72 may produce outputs relating to position, orientation, time, speed, direction of travel, altitude, vertical drop, jump airtime, jump distance, spins, etc. Processor 72 may store the outputs and/or any other data in memory 76. Processor 72 also produces a video signal to be displayed by display unit 90. In some embodiments, the video signal produced by processor 72 for displaying on display 37 comprises one or more of:

an instantaneous speed indication;
an average speed indication;
a position indication;
an orientation indication;
a direction of travel indication;
an altitude indication;
a vertical drop indication;
a jump airtime indication;
a jump distance indication;
a jump rotation indication;
other motion indications;
live or stored images from a camera (such as camera 94 or another camera);
communication indications (e.g., text messages, emails, call indications, voicemail indications, etc.); and
other visual indications.

Power unit 80 comprises a battery 82 and a power conditioning circuit 84. Power conditioning circuit 84 receives electrical power from battery 82 and outputs electrical power at voltages and/or currents suitable for the various components of sensor unit 60, processor unit 70, and display unit 90. In some embodiments, power conditioning circuit 84 may comprise temperature control elements and short circuit protection elements contained in power compartment 34. In some embodiments, power conditioning circuit 84 may comprise power management elements contained in electronics compartment 32.

Display unit 90 comprises a display driver 92 to receive the video signal from processor 72. Display driver 92 is configured to generate driving signals based on the video signal, and to provide the driving signals to a display 37 as described above. In some embodiments, display driver 92 is contained in electronics compartment 32. In some embodiments, display driver 92 may be directly connected or connectable to receive video signals from camera 94.

Figure 9:
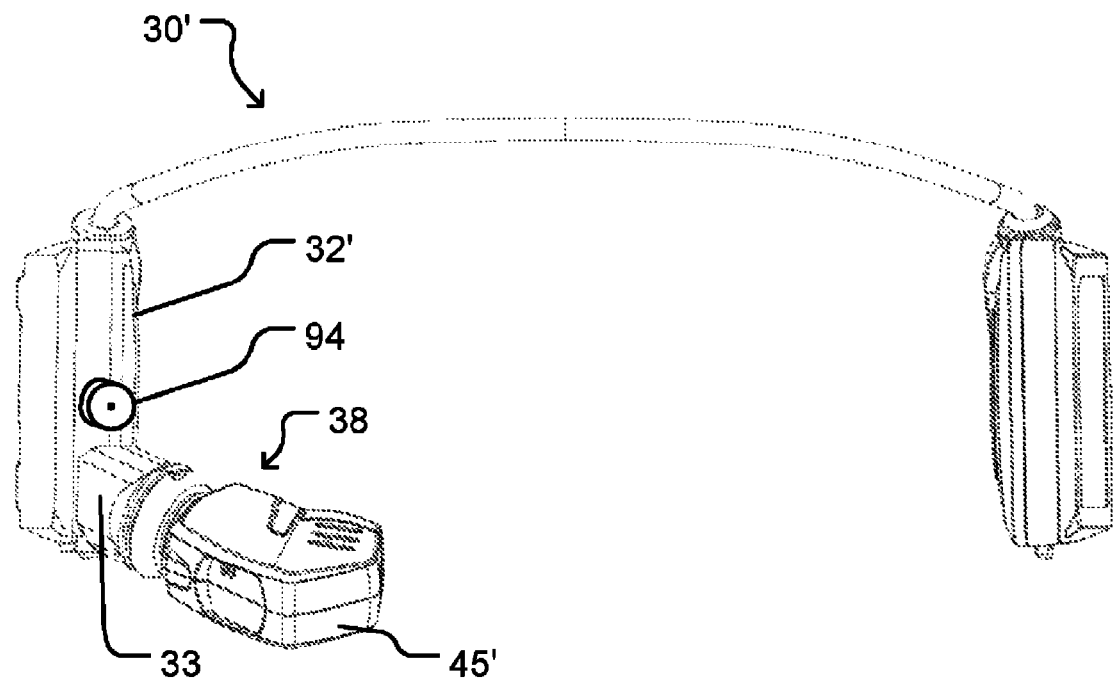
FIG. 9 is a front view of an embodiment of a modular HUD system according to another embodiment.

FIG. 9 shows an example embodiment of HUD system 30' comprising video camera 94. In the illustrated embodiment, video camera 94 is connected to HUD system 30' at electronics compartment 32'. In some embodiments, video camera 94 may be integrated into the casing of electronics compartment 32'. In other embodiments, video camera 94 may be connected to extension 33. Video camera 94 may, for example, be a KPC-S23NNB from Korea Technology & Communications Corporation Limited or any other suitable camera including optical still cameras, infrared cameras, wireless cameras, black and white digital cameras, etc. In some embodiments video camera 94 comprises a high definition camera. In some embodiments, video camera 94 has a 170 degree field of view.

Video camera 94 may be connected to HUD system 30' via a connector such as a clip, snap connection, adhesive, hoop and latch attachment or the like. Video camera 94 may be adjustable to change the angle and/or position of video camera 94 relative to electronics compartment 32' and HUD system 30'. Video camera 94 may be adjustable via an adjustable connector, flexible mount on the video camera 94, or the like. In embodiments where video camera 94 is adjustable, this allows more customization and control by a user as well as more flexibility in what images are captured by video camera 94.

In the illustrated embodiment, video camera 94 is positioned so as to approximate the view of the user's eye without impeding a user's vision by locating it at electronics compartment 32'. This is not necessary. In other embodiments, video camera 94 may be connected to extension 33, to display arm 38, to power compartment 34 or the like. In embodiments where video camera 94 is connected to display arm 38, it may be integrated into the display arm such that the display 37 is facing the user while the video camera 94 is facing away from the user. In particular embodiments, video camera 94 may be integrated into optical enclosure 45'. Optical enclosure 45' may comprise an opening configured to allow video camera 94 to have an approximately similar view to that of the user.

Figure 9A:
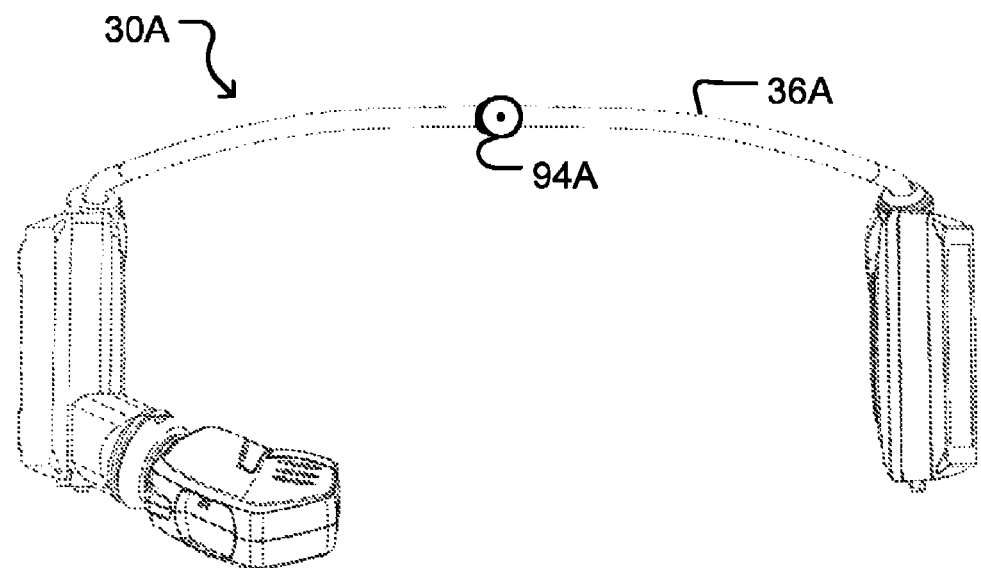
FIG. 9A is a front view of an embodiment of a modular HUD system according to another embodiment.

FIG. 9A illustrates another embodiment of HUD system 30" where video camera 94A is connected to cable 36A. In embodiments where video camera 94A is wired rather than wireless, it may be connected such that the video camera power cables (not shown) pass through cable 36A to power compartment 34 and video camera electronic cables (not shown) pass through cable 36A to electronics compartment 32. In the FIG. 9A embodiment, video camera 94A is positioned directly on cable 36A so that it is aligned with opening 95 of goggle frame 20' (see FIG. 9D). Opening 95 may be formed in the center of bridge 21T' as shown in FIG. 9D. This is not necessary. Opening 95 and video camera 94A may be located at any other position along bridge 21T' and cable 36A. Opening 95 may be sized to allow video camera 94A to pass through it or opening 95 may be smaller than video camera 94A. Opening 95 may be circular, ovoid, rectangular, in the shape of a logo, or any other shape such that video camera 94A may detect images through opening 95. Opening 95 may comprise a transparent layer of material to protect camera 94A such as a flexible plastic layer, lens layer or the like. Opening 95 may be formed in goggle frame 20' even if HUD system 30" does not have a video camera.

In some embodiments, opening 95 passes from the front of goggles frame 20' to channel 26' of goggles frame 20'. Opening 95 may be shaped such that an interior portion 95A is shaped to conform to a casing of video camera 94A and a viewport portion 95B is shaped to provide a visual opening for video camera 94A that is smaller than interior portion 95A as shown in FIG. 9E. Interior portion 95A may be spherical, cuboid, rectangular or any other appropriate shape such that video camera 94A may fit within it. FIG. 9E shows interior portion 95A opening towards the bottom of bridge 21T' such that video camera 94A and cable 36A may be inserted from the bottom. In other embodiments interior opening 95A or opening 95 may be open from any direction (i.e. top, bottom, front, back etc.) and video camera 94A and cable 36A may be inserted from any direction.

In other embodiments, a video camera may be located above or below cable 36 or goggle frame 20. For example, video camera 94A' may, instead of being located on cable 36A as in the FIG. 9A embodiment, may be located above cable 36A. In this embodiment, video camera 94A may be wireless or may be wired to cable 36A.

Figure 9B:
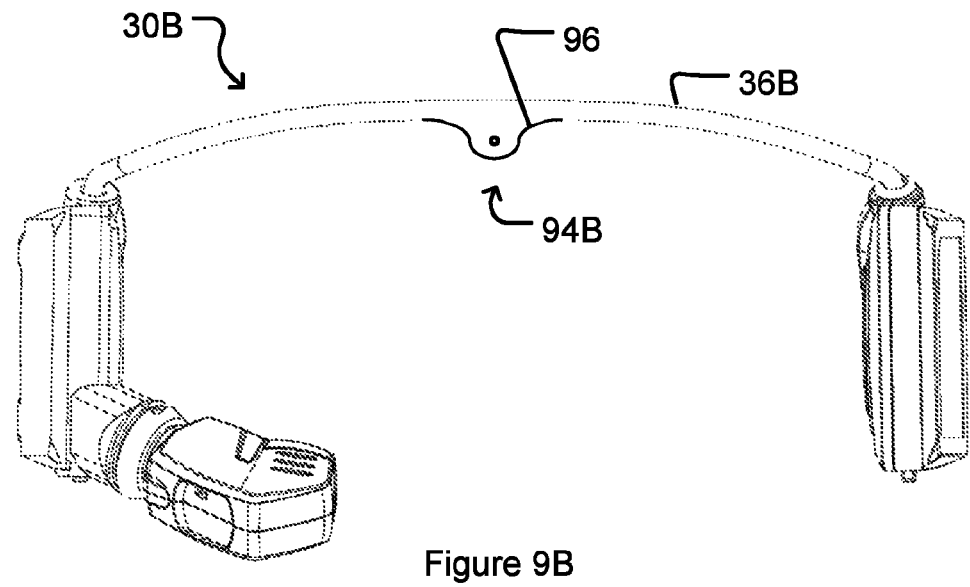
FIGS. 9B and 9C are front views of modular HUD systems according to other embodiments.
Figure 9C:
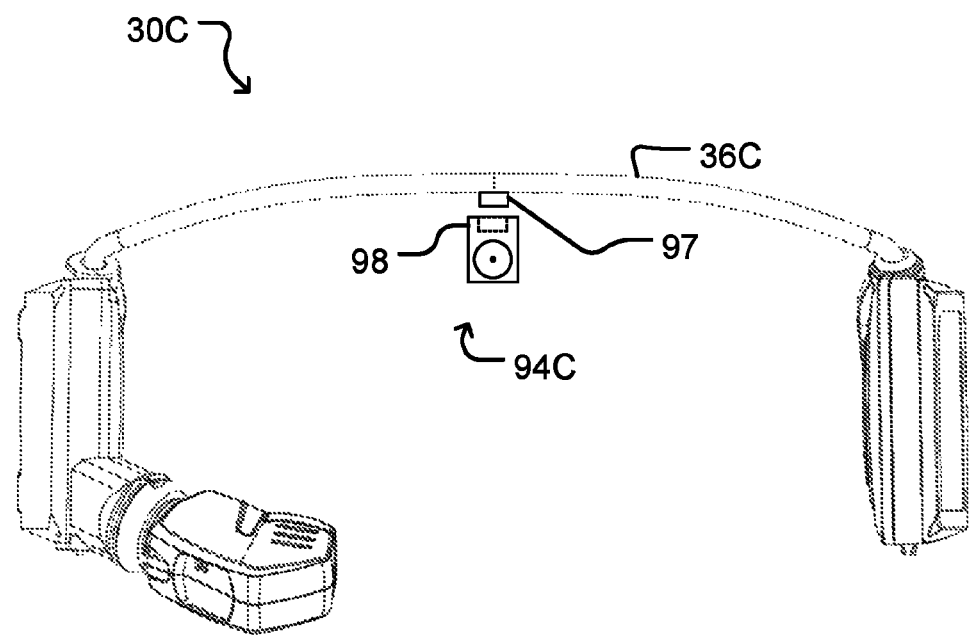
Figure 9D:
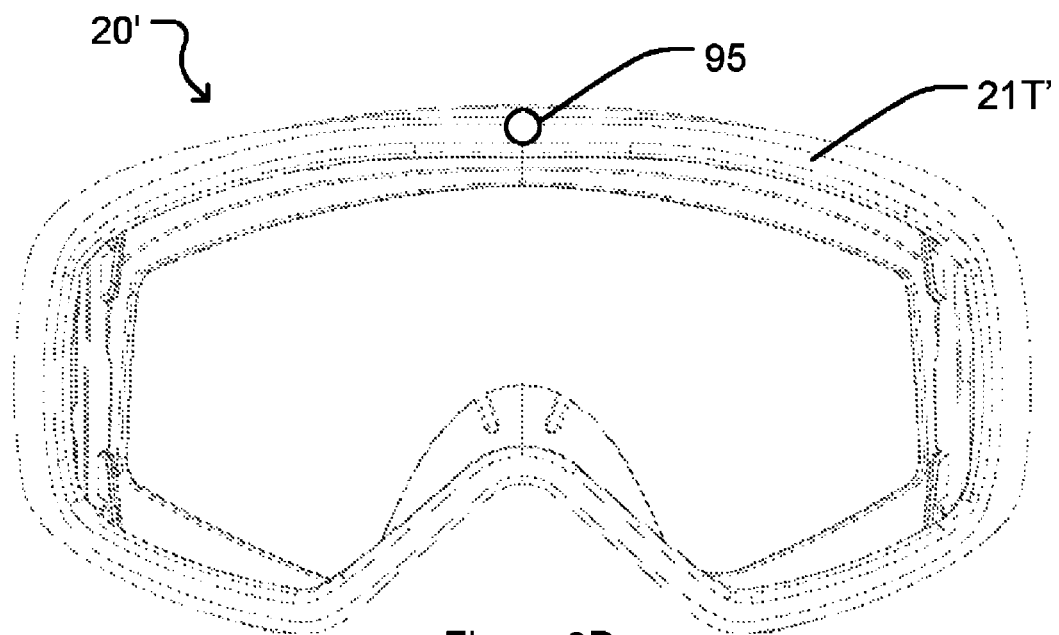
FIG. 9D is a front view of a goggle frame according to one embodiment.
Figure 9E:
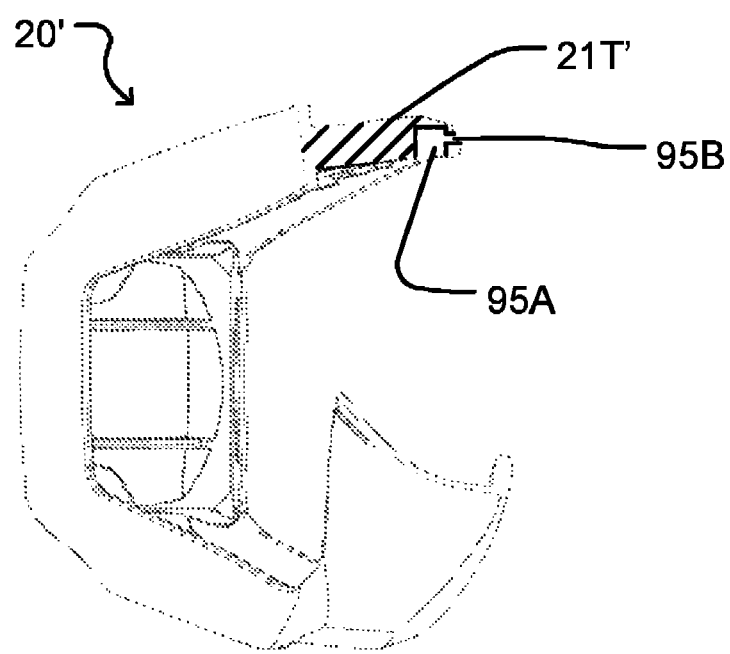
FIG. 9E is a sectional view of a goggle frame according to one embodiment.

FIGS. 9B and 9C respectively show other embodiments of HUD systems 30B and 30C comprising video cameras 94B and 94C located below cables 36B and 36C. In the FIGS. 9B and 9C embodiments cameras 94B and 94C extend sufficiently downwardly from cables 36B and 36C such that camera 94B and 94C may point out trough the lenses of the goggles (not shown) without requiring any additional openings in the goggles frame (not shown). In the FIG. 9B embodiment, camera 94B is directly coupled to cable 36B, for example by overmolding. In the FIG. 9C embodiment, cable 36C has a connector 97 thereon, and camera 94C is mounted on a corresponding connector 98 configured to engage connector 97, such that camera 94C is removable from cable 36C. In some embodiments, connectors 97 and 98 may be configured to "lock" together once engaged, such that camera 94C may not be removed from cable 36C without pressing a release or the like, to avoid inadvertent separation of camera 94C from cable 36C.

Figure 9F:
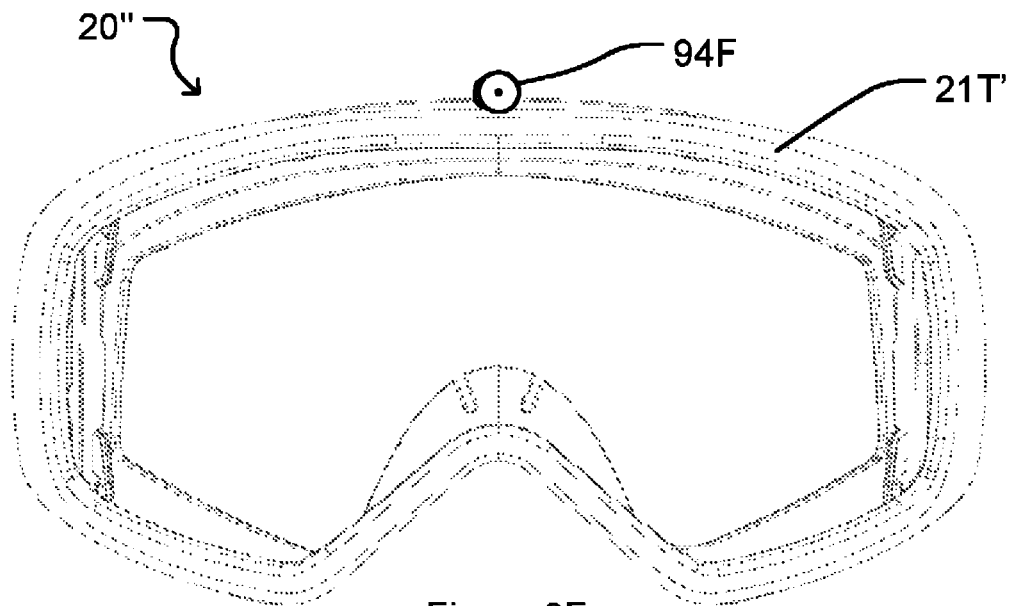
FIGS. 9F and 9G are front views of goggles with modular Heads-Up Display (HUD) systems according to other embodiments.

As shown in FIG. 9F, Video camera 94F may be connected to goggle frame 20" above bridge 21T". Video camera 94F may be configured to attach to bridge 21T" through connectors such as clips, adhesives, snap-fit connections or the like. In some embodiments, bridge 21T" may be modified to provide one or more attachment points for video camera 94F such as a groove, ledge, clip or the like to locate video camera 94F or to facilitate attachment of video camera 94F or both. In particular embodiments, video camera 94F may be attached to cable 36 or another connector connecting camera 94F to electronic system 50 through vents (not shown) in bridge 21T". Vents are known in the art and are commonly filled with padding which may be modified to permit attachment of video camera 94F to goggle frame 20" or cable 36. In other embodiments, a video camera may be located below bridge 21T and bridge 21T may be provided with similar attachment points on a lower edge to those described above. In these embodiments, the video camera may be located behind lens assembly 12, which provides some protection for the video camera.

Figure 9G:
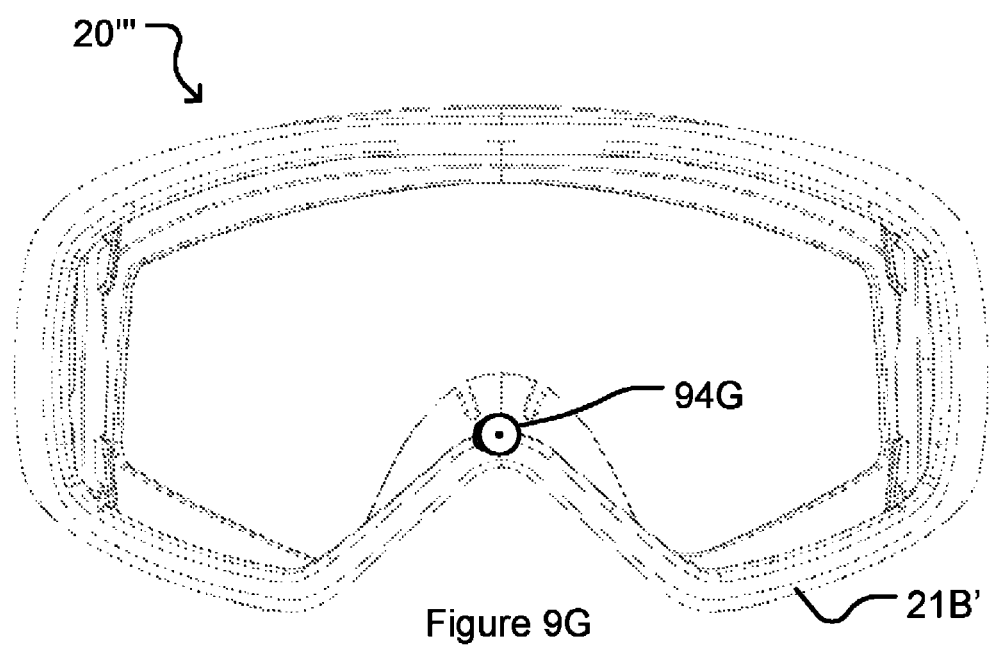
Figure 10:
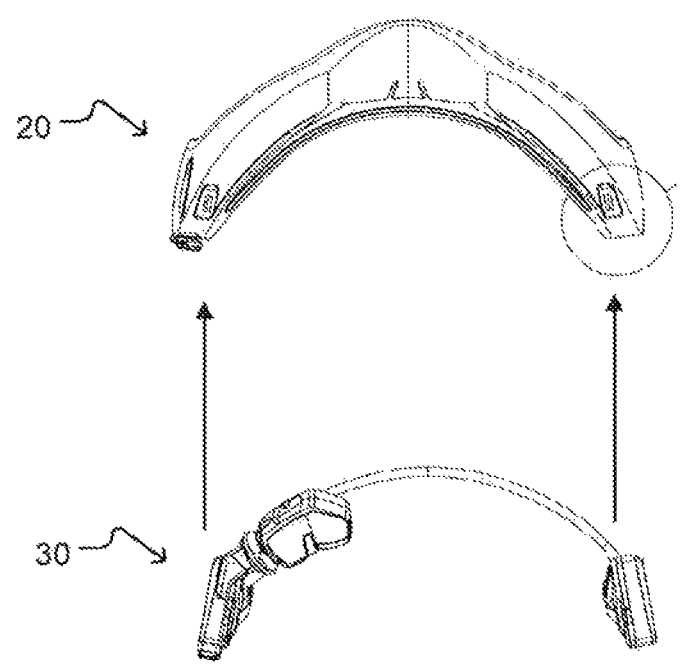
FIG. 10 is a bottom view of a disassembled embodiment of the goggles and the modular HUD system of FIG. 1.

In still other embodiments, a video camera may be located at or near the bottom of goggle frame 20. For example, FIG. 9G shows video camera 94G located at the center of frame bottom 21B'. In the illustrated embodiment, video camera 94G is located behind lens 12 (not shown) and does not substantially interfere with a user's vision. In this embodiment, cable 36 may extend along the bottom 21B' of goggle frame 20''' as described above. As a result, video camera 94G may be connected to cable 36. In other embodiments, cable 36 may pass through the bridge of goggle frame 20''' as described above, and video camera 94G may be independently wired or wirelessly connected to one ore both of electronics compartment 32 and power compartment 34.

Video camera 94 may be adjustable relative to HUD system 30 or goggles frame 20 in any of the embodiments described above. Video camera 94 may be adjustable via an adjustable connector, flexible mount on the video camera 94, or the like. For example, video camera 94 may comprise a flexible mount such as a plastically deformable cable that holds it shape, or an adjustable connector such as a ball and socket joint.

In previously described embodiments HMD system 10 has been assembled from the front of goggle frame 20 (i.e. the side opposite a user's face when wearing goggles). This may require that the goggles first be disassembled in some embodiments by removing lens 12 (see FIG. 1) and provides for a secure assembly once completed with particular protection for the HUD system 30 from snow and other moisture. In other embodiments the HMD system 10 may be assembled from the rear of goggle frame 20 as shown in FIG. 109. For example, in some embodiments HUD system 30 may be installed from the rear of frame 20 by placing compartments 32 and 34 next to the inner side of lens 12, sliding compartments 32 and 34 back into recesses 24L and 24R, and inserting cable 36 into channel 26.

In the example embodiments described above, the entire HUD system 30 is contained within frame 20 when installed. This configuration allows for all of the components of HUD system 30 to be enclosed within lens assembly 12, frame 20 and the user's face when goggles 10 are worn. This reduces the likelihood of damage to the system in the event of a fall because the brunt of the force will be taken by the goggle frame 20 and/or lens assembly 12. Further, frame 20 and lens assembly 12 provide a relatively sealed environment from snow, melted snow and dirt which could affect HUD system 30, although in some embodiments HUD system 30 is itself sealed. The placement of display 37 between lens assembly 12 and a user's face also ensures that display 37 is located within the field of vision of a user when goggles 10 are being worn. This allows a user to view the displayed information merely by moving their eyes and reduces the dangers inherent in, for example, a wrist based display where the user must either tilt their head down or raise their wrist to be able to view any displayed information. Such actions may be dangerous while in the midst of performing physical activities such as skiing, snowboarding, motorcycling or bicycling. Other embodiments may provide HUD systems wherein portions thereof may be located outside the frame to which the HUD system attaches.

Figure 11A:
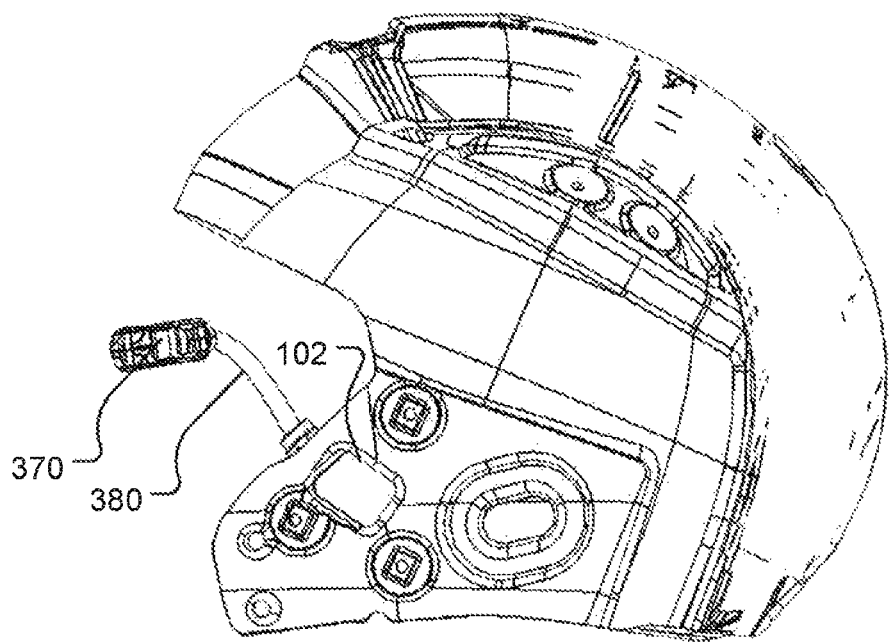
FIG. 11A is a cross-section side view of the modular HUD system with a helmet of FIG. 11.

A number of embodiments described above have referred to the use of goggles in describing the invention. However, the invention is equally applicable to helmets adapted to removably receive a HUD system 300 similar to HUD system 30. For example, FIGS. 110 and 110A show a motorcycle or other helmet 100 configured to receive HUD system 300 by providing a recess 102 in one side of the helmet's interior, which may be surrounded by padding material 104. HUD system 300 may comprise a display arm 380 projecting from the recess to a location in the user's field of view. Display arm 380 may be adjustable through a flexible or deformable arm as shown in FIGS. 811, 11A. HUD system 300 may further comprise a display 370 that may be substantially similar to display 37 of HUD system 30 described above. In the embodiment shown in FIGS. 11, 11A the sensor unit, processor unit, and power unit similar to that of FIG. 8 described above are located in recess 102 on one side of helmet 100. In other embodiments HUD system 300 may comprise one or more compartments received in one or more recesses in either side of the helmet's interior (possibly surrounded by padding material) adapted to receive components of a HUD system. In embodiments with more than one compartment received in corresponding recesses, a channel extending between the recesses may be provided in the helmet frame or in the padding.

Where a component (e.g. an assembly, device, etc.) is referred to above, unless otherwise indicated, reference to that component (including reference to a means) should be interpreted as including as equivalents of that component any component which performs the same function as the described component, including components which are not structurally equivalent to the disclosed structures which perform the function in the illustrated exemplary embodiments of the invention.

Unless the context clearly requires otherwise, throughout the description and the claims, the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole. While a number of exemplary aspects and embodiments have been discussed above, those of skill in the art will recognize certain modifications, permutations, additions and sub-combinations thereof.

What is claimed is:

1. A Heads-Up Display (HUD) system configured for removable installation in headgear having a frame, the HUD system comprising:
    an electronic system comprising one or more sensors, a processor for processing signals from the one or more sensors and outputting image data, a display for displaying the image data, and a power supply;
    a first compartment and a second compartment for housing components of the electronic system other than the display, the first compartment and the second compartment configured to be removably received in first and second recesses in the frame of the headgear;
    a cable connecting the first compartment and the second compartment; and,
    a display arm for mounting the display, the display arm extending from the first compartment to a location within a field of vision of a user wearing the headgear, wherein the display arm is movable relative to the first compartment to permit adjustment of one or more of a viewing angle and a position of the display; and
    a camera configured to capture image data and provide the captured image data to the processor; wherein the camera is coupled to the cable; wherein the camera is mounted on a connector configured to engage a corresponding connector on the cable, the camera being removably coupled to the cable.

2. The HUD system of claim 1 wherein the cable has an adjustable length.

3. The HUD system of claim 1 wherein the first compartment comprises an electronics compartment housing the one or more sensors and the processor, and the second compartment comprises a power compartment housing the power supply.

4. The HUD system of claim 3 wherein the cable is longitudinally adjustably connected to the power compartment.

5. The HUD system of claim 4 wherein the cable comprises an anchor near an end thereof within the power compartment, and wherein the power compartment defines a chamber therein configured to allow movement of the anchor, the chamber having an opening for receiving the cable and comprising a stop near the opening to prevent removal of the anchor from the chamber.

6. The HUD system of claim 1 wherein the cable comprises a spiraled or coiled stretchable cable.

7. The HUD system of claim 1 wherein the display arm comprises an optical enclosure housing the display, an extension projecting from the first compartment, and a ball and socket joint connecting the optical enclosure and the extension.

8. The HUD system of claim 1, wherein at least the first compartment and the second compartment comprise connecting features configured to make a snap-fit connection with corresponding connecting features of at least the first recess and the second recess in the frame; and
    wherein the connecting features of the at least first compartment and second compartment comprise a retaining element extending therefrom, the retaining element having an angled face and a retaining recess adjacent thereto, wherein the angled face is configured to be inserted into a retaining feature on the at least first recess and second recess in the frame comprising a projection configured to be received in the retaining recess.

9. The HUD system of claim 8 wherein the connecting features of the at least first compartment and second compartment comprise one or more protrusions configured to be received in one or more corresponding recesses in the at least first recess and the second recess in the frame.

10. The HUD system of claim 1, further comprising a global positioning satellite (GPS) receiver configured to output GPS signals to the processor.

11. The HUD system of claim 1 comprising a remote control for providing input commands to the processor.

12. The HUD system of claim 11 wherein the remote control comprises a thermometer for providing temperature readings to the processor.

13. The HUD system of claim 1 wherein the cable is configured to be received in a channel of a goggles frame and wherein the camera extends downwardly from the cable such that the camera points directly out of a lens opening of the goggles frame.

14. The HUD system of claim 1 wherein a viewing direction of the camera is adjustable.

15. The HUD system of claim 1 wherein the display is configured to act as a viewfinder for the camera.

16. A goggles frame comprising a top portion, first and second side portions and a bottom portion, the goggles frame defining a first recess in the first side portion configured to removably receive a first compartment of a Heads-Up Display (HUD) system, and a second recess defined in the second side portion configured to removably receive a second compartment of the HUD system;
    wherein the goggles frame comprises a cable connecting the first compartment and the second compartment; and
    wherein the goggles frame comprises a camera configured to capture image data and provide the captured image data to the processor; wherein the camera is coupled to the cable; wherein the camera is mounted on a connector configured to engage a corresponding connector on the cable, the camera being removably coupled to the cable.

17. The goggles frame of claim 16, further comprising an electronic system comprising one or more sensors, a processor for processing signals from the one or more sensors and outputting image data, a display for displaying the image data, and a power supply; wherein the first compartment or the second compartment housing one or more components of the electronic system.

18. The goggles from of claim 17, further comprising a global positioning satellite (GPS) receiver configured to output GPS coordinate information to the processor.

19. An apparatus comprising:
a Heads-Up Display (HUD) system comprising:
a frame connector;
a processor, a power source, and one or more sensors coupled to the frame connector, the processor configured to receive signals from the one or more sensors and output image data; and,
a display mounted on a display arm extending from the frame connector, the display configured to display images based on the image data, and
a goggles frame configured to releasably receive the frame connector;
wherein the display is located within a field of view of a user wearing the goggles frame when the frame connector is received by the goggles frame, and
a camera configured to capture image data and provide the captured image data to the processor; wherein the camera is coupled to the cable; wherein the camera is mounted on a connector configured to engage a corresponding connector on the cable, the camera being removably coupled to the cable.

20. The apparatus of claim 19, further comprising a global positioning satellite (GPS) receiver configured to output GPS coordinate information to the processor.

* * * * *

UNITED STATES PATENT AND TRADEMARK OFFICE
CERTIFICATE OF CORRECTION

PATENT NO. : 9,885,871 B2  
APPLICATION NO. : 15/149551  
DATED : February 6, 2018  
INVENTOR(S) : Hamid Abdollahi et al.

Page 1 of 1

It is certified that error appears in the above-identified patent and that said Letters Patent is hereby corrected as shown below:

On the Title Page

On the page 2, in item (60), in Column 1, in "Related U.S. Application Data", Line 5, delete "61/502,566," and insert -- 61/502,568, --, therefor.

In the Claims

In Column 17, Line 13, in Claim 18, delete "from" and insert -- frame --, therefor.

Signed and Sealed this  
Thirteenth Day of November, 2018

Andrei Iancu  
*Director of the United States Patent and Trademark Office*